US010631379B2

(12) United States Patent
Deixler et al.

(10) Patent No.: US 10,631,379 B2
(45) Date of Patent: Apr. 21, 2020

(54) CONTROLLING A LIGHTING SYSTEM

(71) Applicant: SIGNIFY HOLDING B.V., Eindhoven (NL)

(72) Inventors: Peter Deixler, Valkenswaard (NL); Remco Magielse, Tilburg (NL); Peter Rijskamp, Venray (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/090,949

(22) PCT Filed: Mar. 29, 2017

(86) PCT No.: PCT/EP2017/057371
§ 371 (c)(1),
(2) Date: Oct. 3, 2018

(87) PCT Pub. No.: WO2017/174412
PCT Pub. Date: Oct. 12, 2017

(65) Prior Publication Data
US 2019/0124749 A1 Apr. 25, 2019

(30) Foreign Application Priority Data
Apr. 6, 2016 (EP) .................................... 16164058

(51) Int. Cl.
H05B 37/02 (2006.01)
G06F 3/01 (2006.01)
(Continued)

(52) U.S. Cl.
CPC ......... *H05B 37/0227* (2013.01); *G06F 3/012* (2013.01); *G06F 3/013* (2013.01);
(Continued)

(58) Field of Classification Search
CPC ............ H05B 37/0227; H05B 37/0245; H05B 33/0845; H05B 33/0863; H05B 37/0218;
(Continued)

(56) References Cited

U.S. PATENT DOCUMENTS 7,242,152 B2  7/2007 Dowling et al.
2010/0181938 A1  7/2010 Boleko Ribas et al.
(Continued)

FOREIGN PATENT DOCUMENTS

WO  2016034546 A1  3/2016

*Primary Examiner* — Renan Luque
(74) *Attorney, Agent, or Firm* — Akarsh P. Belagodu

(57) ABSTRACT

A method of controlling a plurality of luminaires of a lighting system. The method comprising: capturing with an imaging device, by a user adopting a stationary position, at least one image of the luminaires in a predominant field of view of the user in the stationary position; processing the at least one image to determine the predominant field of view of the user in the stationary position and a location of each of the luminaires relative to the determined predominant field of view of the user; and controlling the luminaires of the lighting system to emit illumination, based on their determined locations relative to the predominant field of view of the user in the stationary position.

14 Claims, 14 Drawing Sheets

(51) Int. Cl.
    *G06T 7/73*           (2017.01)
    *H04N 5/232*        (2006.01)
    *G06K 9/00*          (2006.01)

(52) U.S. Cl.
    CPC .......... *G06T 7/73* (2017.01); *H04N 5/23238* (2013.01); *H05B 37/0245* (2013.01); *G06K 9/00671* (2013.01)

(58) Field of Classification Search
    CPC ............ H05B 37/0236; H05B 37/0272; H05B 37/029; H05B 41/32; H04N 5/23238; G06T 7/73; F21V 21/15; G08C 17/02; G08C 2201/93; H04B 10/116; H04L 61/2007; H04L 61/6022; H04M 1/72533; H04W 84/12
    See application file for complete search history.

(56) References Cited

U.S. PATENT DOCUMENTS

| | | | |
|---|---|---|---|
| 2011/0234386 A1* | 9/2011 | Matsuda | G06F 3/017 340/12.54 |
| 2012/0286670 A1 | 11/2012 | Van Herk et al. | |
| 2014/0091731 A1 | 4/2014 | Fushimi | |
| 2015/0002026 A1 | 1/2015 | Gritti | |
| 2015/0282282 A1 | 10/2015 | Breuer et al. | |
| 2015/0317518 A1* | 11/2015 | Fujimaki | G08C 17/02 345/633 |
| 2016/0091877 A1* | 3/2016 | Fullam | G05B 15/02 700/276 |
| 2016/0277772 A1* | 9/2016 | Campbell | H04N 21/21805 |
| 2016/0301862 A1* | 10/2016 | Rantakokko | G06F 3/011 |
| 2016/0379418 A1* | 12/2016 | Osborn | G06T 19/20 345/589 |

* cited by examiner

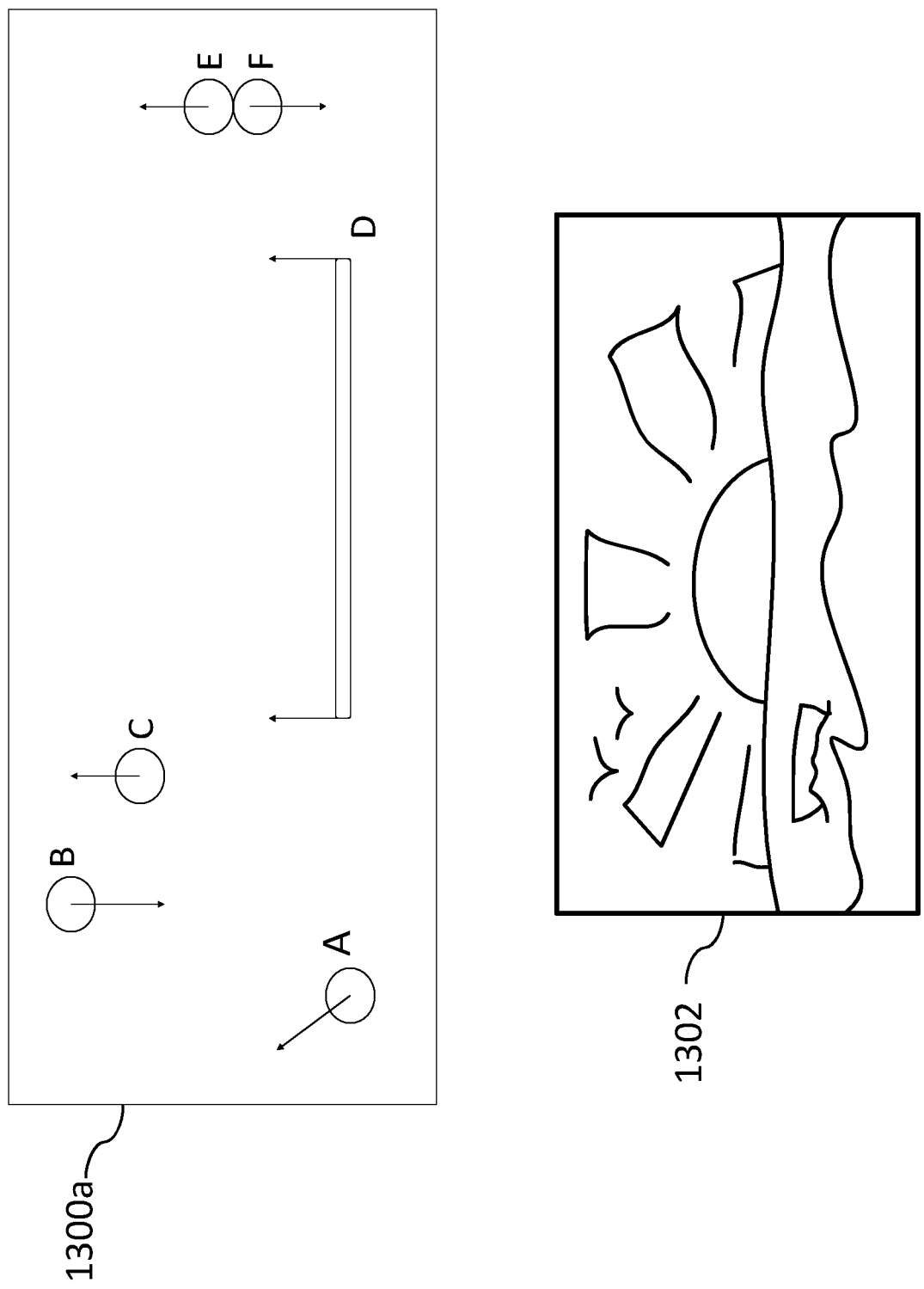

CONTROLLING A LIGHTING SYSTEM

CROSS-REFERENCE TO PRIOR APPLICATIONS

This application is the U.S. National Phase application under 35 U.S.C. § 371 of International Application No. PCT/EP2017/057371, filed on Mar. 29, 2017, which claims the benefit of European Patent Application No. 16164058.6, filed on Apr. 6, 2016. These applications are hereby incorporated by reference herein.

TECHNICAL FIELD

The present disclosure relates to controlling a lighting system comprising a plurality of illumination sources ("luminaires") based on one or more captured images of the luminaires.

BACKGROUND

"Connected lighting" refers to lighting systems in which illumination sources are controlled not by a traditional, manually-operated mechanical switch between the mains and each illumination sources (or not only by such a switch), but by a means of a more intelligent controller which connects to the luminaires of the system either via a direct wireless data connection with each luminaire (e.g. via ZigBee) or via a wired or wireless data network (e.g. via a Wi-Fi network, 3GPP network or Ethernet network). For instance the controller may take the form of an application running on a user terminal such as a smartphone, tablet, or laptop or desktop computer, or on some other computer device or devices, such as a server or network gateway (bridge). The controller may be localized to a single device, or distributed across multiple devices (e.g. the user device and bridge) and generally refers to any control apparatus implemented in hardware, software or a combination of both that is capable of intelligent control.

SUMMARY

According to a first aspect disclosed herein there is provided a method of a controlling a lighting system, wherein the lighting system comprises a plurality of luminaires arranged to emit light into a physical space the method comprising: capturing with an imaging device a plurality of images of the luminaires as a user performs at least one scanning motion with the imaging device across the physical space; combining at least some of the images to generate a composite image wherein the panoramic image covers a wider field of view than any one of those images individually; whilst at least some of the images are being captured, controlling the luminaires to render an illumination pattern that isolates a contribution of each luminaire to the illumination of the physical space; determining a relative location of each luminaire in the physical space, by processing the composite image; determining the contribution of each of the luminaires to the illumination of the physical space, using the images captured when rendering the illumination pattern; and controlling the luminaires to illuminate the physical space, based on their determined locations and determined contributions. The method may for example be implemented by a controller for a connected lighting system of the kind described above.

An advantage of this scanning-based approach, in which the user captures multiple images whilst manually scanning the imaging device, is that it does not require any specialized imaging hardware (such as 360 degree or other wide-angle camera devices, or pre-installed sensor equipment). This allows the invention to be implemented using an imaging device with a limited field of view, for example a camera device integrated in modern smartphone or tablet devices, a peripheral webcam device, or other types of consumer device that are becoming more readily available, such as augmented or virtual reality devices (e.g. wearable headsets and other wearable devices). The imaging device may be a conventional visible light (and/or infrared) camera, though the invention is not limited in this respect. For example, and without limitation, it is envisaged that future generations of consumer device may incorporate other types of imaging device, such as 3D laser scanning devices.

The composite image may be a panoramic image, i.e. a static image generated by stitching together the images) or a moving image, i.e. a video, wherein the images form video frames to be played out, generated in a conventional manner. Either way, it is possible to determine more information about the relative locations of the luminaires from the composite image over its wider field of view (e.g. based on their spatial proximity within a panoramic image, or temporal proximity within a moving image) than from any one of the images individually in isolation.

The scanning motion is predominantly rotational, such that different areas of the user's field of vision are captured by the images. The captured images as whole thus cover a greater area of the user's field of vision than any one of the images individually. By processing the plurality of images, it is thus possible to ascertain more information about the location so the luminaires within the user's field of vision that could be determined from any one of the images alone. This allows, for example, luminaires that are predominantly only in the user's peripheral vision from those that are predominantly within his center of gaze.

In preferred embodiments, some or all of the captured images may be combined (i.e. stitched-together, using a panoramic stitching algorithm) to generate the panoramic image from which the luminaire locations are determined. Those same images (or at least some of them) may also be used to determine the contributions from the luminaires, or alternatively the images used to determine the contributions may be different. In general there may be no overlap in the images used to determine the locations and those used to determine the contributions (e.g. a first set of images captured at a first time may be used to generate the panoramic image, and a second set of images captured at a different time may be used to determine the contributions), total overlap (such that the same images are used to determine both), or partial overlap in the images used.

In embodiments, the illumination pattern may be a static illumination pattern.

The static illumination pattern may be rendered by controlling at least two of the luminaires to emit light of different colors, thereby isolating their respective contributions.

The illumination pattern may be a dynamic illumination pattern that varies as the images are captured so as to isolate the contributions.

The dynamic illumination pattern may be rendered by varying the intensity of light emitted by at least two of the luminaires such that, in at least two of the images, a different combination of intensities from those two luminaires is captured.

For example, when a first of those two images is captured, a first of those two luminaires is in an emitting state and a second of those two luminaires is in a non-emitting state and, when a second of those two images is captured, the first luminaire is in a non-emitting state and the second luminaire is in an emitting state.

The method may comprise detecting the start of the scanning motion of the camera device, wherein the luminaires are controlled to begin rendering the dynamic illumination pattern in response.

The dynamic illumination pattern may be rendered by varying a color of light emitted by at least two of the luminaires such that in at least some of the plurality of images, a different combination of colors from each of those the luminaires is captured.

At least two of the images may cover the same region of the physical space as each other at different times. For example, a respective image of that region is captured for each of the luminaires, when only that luminaire is in an emitting state.

A first set of the captured images may be combined to generate the composite image from which the locations are determined, and the contributions may be determined using a second set of the captured images different from the first set of images.

The first set of images may be captured as the user performs a first scanning motion across the physical space, and the second set of images is captured as the user performs a matching scanning motion across the physical space whilst the illumination pattern is rendered.

The second set of images may be captured after the locations have been determined from the composite image, and the determined locations may be used to determine the illumination pattern that is rendered as the second set of images is captured.

For example, the determined locations may be used to render to a dynamic illumination pattern that guides the user though the sweeping motions, e.g. by prompting the user to scan in a certain direction form luminaire-to-luminaire at a certain speed. For example, a spatial ordering of the luminaires may be determined from their locations, and the determined ordering used to render the dynamic illumination pattern.

The second set of images may be captured after the composite image is generated, wherein the method may comprise controlling a display device to display image data of the composite (e.g. panoramic) image to the user as the second set is captured (e.g. all or part of the composite image.

For each of the luminaires, at least one of the following may also be used in determining its location:
 a time at which an image containing light from that luminaire was captured,
 an orientation of the imaging device when that image was captured, as measured using an orientation sensor coupled to the imaging device, and
 a location of the imaging device as measured using a location sensor coupled to the imaging device.

At least one of the luminaires emits light into which a luminaire identifier is modulated when rendering the illumination pattern, which is used in determining the contribution of that luminaire.

The contribution of each luminaire may be determined by determining a shape, a size and/or a location of at least one illumination footprint cast by that luminaire on a surface of the physical space during the rendering of the illumination pattern.

Alternatively or in addition, the contribution may be determined by determining at least one color and/or intensity distribution over an area or volume of the physical space resulting from the light emitted by that luminaire.

The method may comprise comprising determining from the composite image, for at least one of the luminaires, a shape and/or a size of that luminaire which is used to control the illumination of that luminaire.

The steps may further comprise tracking movements of the imaging device as the scanning motion is performed using image data received from the imaging device and/or sensor data received from a separate sensor coupled to the imaging device, wherein the dynamic illumination pattern is rendered based on the tracking.

The tracking may comprise, at each of a plurality of times during the scanning motion, determining which of the luminaire located closest to an optical axis of the imaging device at that time, wherein that luminaire is controlled to isolate its contribution at that time.

According to a second aspect of the present invention a method of controlling a plurality of luminaires of a lighting system comprises the following steps: capturing with an imaging device, by a user adopting a stationary position, at least one image of the luminaires in a predominant field of view of the user in the stationary position; processing the at least one image to determine the predominant field of view of the user in the stationary position and a location of each of the luminaires relative to the determined predominant field of view of the user; and controlling the luminaires of the lighting system to emit illumination, based on their determined locations relative to the predominant field of view of the user in the stationary position.

The term "predominant" in the context of the present invention refers to the user's natural facing direction when he is adopting the stationary position. "Stationary position" refers to a human position at a certain location, which may for example be a sitting, reclining or lying-down position, at this location, e.g. on a piece of furniture at this location. When adopting this stationary position, the user is still free to, for example, tilt or rotating his head, or looking up or to the side, thereby rotating his line of sight. Nonetheless, he is naturally inclined to look in a certain direction (his "predominant facing direction" when adopting this stationary position) when adopting this stationary position, depending on the individual circumstances of his environment. Generally speaking, this will be a forward facing direction, wherein both his head and eyes are facing more or less directly forward. However, his predominant facing direction may be influenced to some extent by his surroundings—e.g. it may be towards a display device in his vicinity, such as a desk computer display or television.

The relative location of the luminaire means its location in the physical space relative to the other luminaire(s).

The term "at least one image of multiple luminaires" (or similar) in the context of the present invention can mean one image in which all of the luminaires are detectable, or multiple images such that each of the luminaires is detectable in at least one of the images. Preferably, multiple images are captured and stitched together to generate a panoramic image in which all of the luminaires are detectable.

The location of a luminaire in a physical space means its location relative to any other luminaire(s) in the physical space.

In embodiments, determining the predominant field of view comprises determining a predominant line of sight of the user, which lies along his predominant facing direction when adopting the stationary position, the luminaire positions being determined relative to the determined predominant line of sight.

A plurality of images may be captured as the user performs an expected scanning motion across at least his predominant field of view whilst remaining in the stationary position, which are processed to determine the predominant field of view and the luminaire locations relative thereto.

The steps may comprise instructing the user to perform the expected scanning motion across his predominant field of view whilst remaining in the stationary position.

The instructing step may comprise: controlling the luminaires to emit a dynamic illumination pattern as the images are captured so as to guide the user through the expected scanning motion, and/or controlling an output device available to the user to output to the user at least one instruction to covey the expected scanning motion to the user.

The output device may be a display, which is controlled to display the at least one instruction to the user.

The output device and imaging device may be integrated in a user device held by the user.

The processing step may comprise combining the images to generate a composite image, the composite image covering a greater area of the user's predominant field of view than any one of the images individually, wherein the locations are determined by processing the composite image.

The composite image may be a panoramic image is generated by a panoramic image stitching algorithm executing a processor of the user device.

The expected scanning motion may comprise gradually rotating the imaging device from an initial expected orientation to another expected orientation.

The initial orientation or the other orientation may be such that an optical axis of the imaging device lies substantially parallel to the predominant line of sight of the user in the stationary position.

The initial orientation may be such that the optical axis of the imaging device lies substantially parallel to the predominant line of sight, whereby the optical axis is rotated away from the predominant line of site as the scanning motion is performed.

The scanning motion may further comprise, upon reaching the other orientation, gradually rotating the imaging device back to the initial orientation and from there to a yet another expected orientation.

The scanning motion may be such that an optical axis of the imaging device remains substantially parallel to a horizontal plane throughout.

At least one of the luminaires and/or the output device may be controlled to notify the user when the imaging device has reached the other orientation and/or the further orientation.

Determining the predominant field of view may comprise determining at least a predominant center gaze region for the user in the stationary position within the at least one image, and a predominant peripheral vision region for the user within the at least one image, wherein the luminaires may be controlled based on whether they are within the center gaze region or the peripheral vision region.

The processing step may further comprise detecting a glare induced, within the user's predominant field of view, in the at least one of the image by at least one of the luminaires, which is used in controlling that luminaire's illumination.

The step of determining the user's predominant field of view may comprise identifying a predetermined type of object in the at least one image, the luminaire locations being determined relative to the identified object.

The object may be a display screen.

The instructing step may comprise conveying to the user an angular range over which the imaging device should be scanned, wherein the user's predominant field of view is determined based on the conveyed angular range.

Alternatively or in addition, the steps further comprise determining an angular range over which the imaging device has been scanned, using the at least one image and/or sensor data captured as the scanning motion is performed by a separate sensor coupled to the imaging device, wherein the user's predominant field of view is determined based on the determined angular range.

The method may comprise controlling a display to display to the user image data of the at least one captured image, and receiving from the user via a user interface a selection of at least one point and/or at least one region within the displayed image data, wherein the predominant field of view is determined based on the received user selection.

The panoramic image may be displayed on the display such that the at least one point and/or area is selected in the panoramic image.

The determine step may comprise determining a center of gaze of the user for the predominant facing direction when adopting the stationary position, the luminaire locations being determined relative to the determined center of gaze.

A third aspect of the present invention is directed to a method of controlling a lighting system, comprising at least two luminaires arranged to illuminate a physical space, to render a version of a selected scene image in the physical space, the method comprising the following steps: capturing with an imaging device at least one image of the physical space; using the captured at least one image to determine, for each of the luminaires, at least one location in the physical space associated with that luminaire; receiving from a user a selection of a scene image to be rendered; processing the selected scene image to select at least two colors in the scene image for rendering, and determine a location of each of the selected colors within the scene image; and comparing the determined scene image locations with the determined luminaire locations so as to identify, for each of the determined scene image locations, a matching one of the determined locations in the physical space, and controlling the luminaire associated with that location in the physical space to emit illumination rendering the color at that scene image location, thereby causing the luminaires to render a version of the selected scene image in the physical space.

Note that the selected colors may be averaged colors e.g. color vector generated by averaging similar pixel values. As such, it may not correspond exactly to a single pixel in the image, but rather to a perceived color over multiple pixels in the image. Similarly, the location of the color in the image does not necessarily mean an individual pixel location, nor does it necessarily mean an exact (x,y) location in the image. For example, the determined location of a selected color may be a determined region of the image (e.g. central, top, bottom, top-left, bottom-right etc.) that is dominated by that color, for example, because that region is dominated by a set of similar colors in color space which averages out to this color. The colors may for example be represented as color vectors in color space, and "similar" color in this context refers to colors having similar color vectors. The average of that color can be defined as a number of different mathematical operations on these color vectors, which may for example include weighting to account for human sensitivity and/or one or more color capabilities of the lighting system (e.g. to bias the selection towards the gamut of the lighting system).

A location associated with a luminaire means a location at which light from that luminaire is perceptible when emitting. This may be the location of the luminaire itself, but it can also be a location of a surface onto which the luminaire is projecting so as to cast an illumination footprint, e.g. the associated location may be on the ceiling for a luminaire on the floor, if that is where its light is most perceptible. A luminaire may have multiple associated locations e.g. its own location plus that of one or more of its illumination footprints, or multiple footprint locations.

In embodiments, in the capturing step, multiple images may be captured as a scanning motion is performed with the imaging device by the user, and the method may further comprise: combining the images to generate a composite image covering a wider field of view than any of the multiple images individually, wherein the locations in the physical space are determined from the composite image.

The scene image may be an additional image captured by the user with an imaging device, or a stored image retrieved from electronic storage when selected.

The method may further comprise further comprise: determining from the at least one image at least one illumination characteristic of an uncontrollable source of illumination in the physical space that is not part of the lighting system, wherein the luminaires are controlled to render the version of the scene image accounting for the uncontrollable illumination source based on its determined illumination characteristic.

Note that "uncontrollable" in this context means not controllable within the infrastructure of the lighting system. This does not necessary mean it is entirely uncontrollable, for example it may be a luminaire that is part of a different lighting system, or it may be a natural light source, such as a window (which cannot be controlled using the infrastructure of the lighting system, but may be controllable to an extent e.g. by drawing a curtain or blind across it).

The uncontrollable illumination source may be a natural illumination source, such as a window.

At least one image may be captured of the natural illumination source in an unobstructed state to capture daylight from it, which is processed to determine at least one daytime illumination characteristic thereof; and wherein at least one further image may be captured of the natural illumination source in an obstructed state, which is processed to determine at least one night-time illumination characteristic thereof. The controlling step may comprise determining a current time of day, and the version of the lighting scene is rendered accounting for the current time of day using the determined daytime and/or night-time illumination characteristic of the natural illumination source.

The colors may be selected in the scene image automatically.

Alternatively the colors may be selected according to one or more color selection instructions received from the user via a user interface.

The location associated with at least one of the luminaires may a location of that luminaire in the physical space, i.e. a location of the luminaire itself. Attentively, the location associated with at least one of the luminaires is a location of an illumination footprint cast by that luminaire on a surface of the physical space. Multiple such locations associated with any one luminaire may be determined.

For at least one of the luminaires, the at least one captured image may also be used to determine a shape and/or a size of: that luminaire and/or at least one illumination footprint cast by that luminaire on a surface of the physical space.

The colors may be selected by determining a color palette of the image, the color palette being a set of color identifiers corresponding to colors occurring in the scene image.

For each color identified in the color palette, the scene image location for that color may be determined by identifying a region of the scene image in which that color is dominant (e.g. using blob detection), wherein one or more of the luminaires associated with locations in a matching region of the physical space are controlled to render that color.

The color palette may be generated based on respective frequencies at which different colors occur in the image, and/or at least one color capability of the luminaires of the lighting system e.g. based on a gamut of the individual luminaire(s) and/or the lighting system as a whole.

Note any features of the first second or third aspect, or embodiments thereof, may be implemented in embodiments of any other of the first second and third aspects.

It will be noted that, in the second and third aspects, it is not essential to generate a composite image, such as a panoramic image (though such a panoramic image may be generated in some embodiments thereof).

Additional aspects of the present invention are directed to a lighting control apparatus for a lighting system, which is configured to implement the method of any of the third second or third aspects (or embodiments therefor); and to a computer program product comprising code stored on a computer readable storage medium and configured when executed to implement the method of any preceding claims.

BRIEF DESCRIPTION OF THE DRAWINGS

To assist understanding of the present disclosure and to show how embodiments may be put into effect, reference is made by way of example to the accompanying drawings in which:

FIG. 13a illustrates a schematic representation of a scene image (1302) and a panoramic image (1300) of a physical space in which luminaires A-F are visible to a user and each emit light with a respective directionality.

DETAILED DESCRIPTION OF EMBODIMENTS

Figure 1:
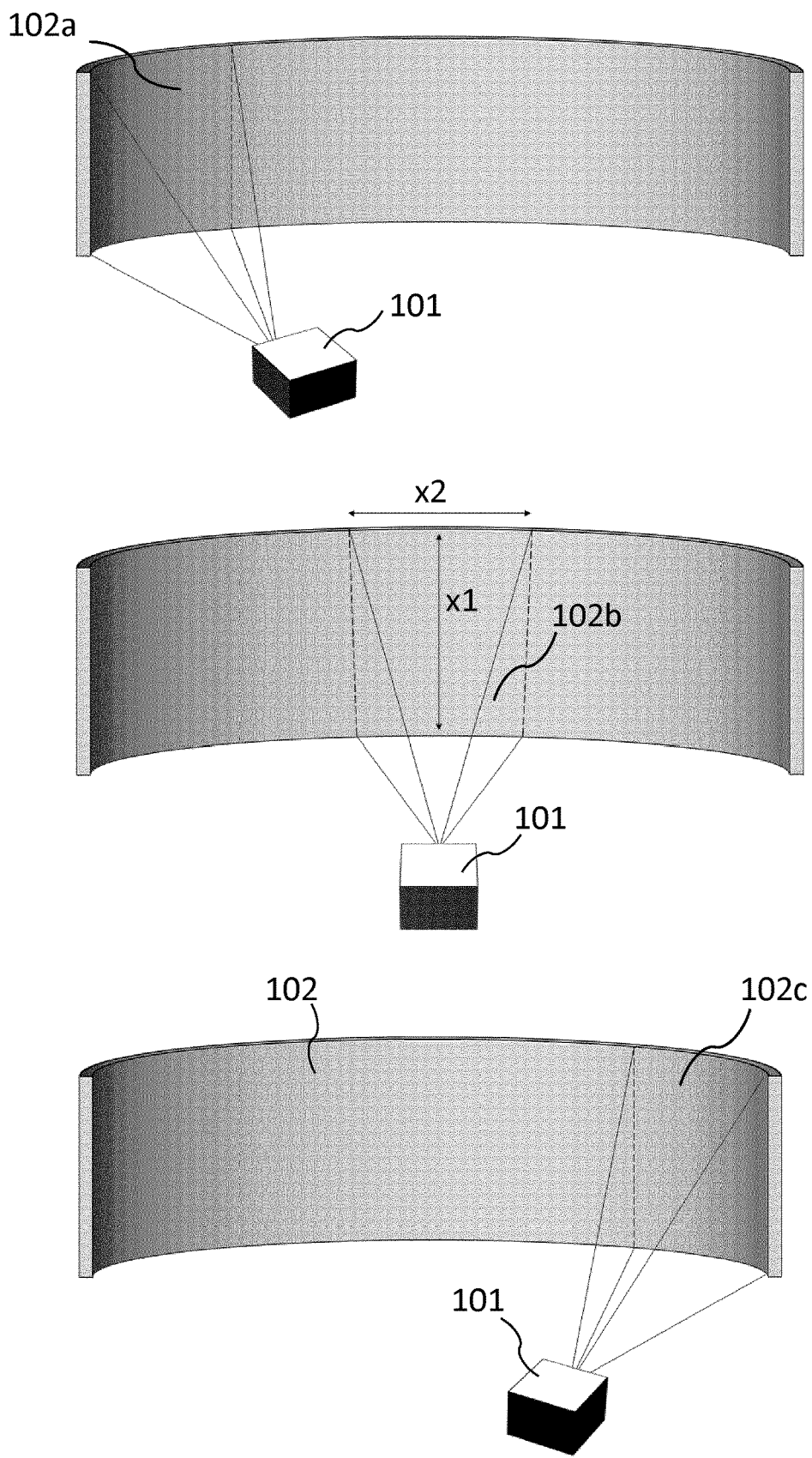
FIG. 1 is a schematic representation of a process for capturing a panoramic image.

The term panoramic image refers to an image that is generated by stitching multiple images together by applying a suitable image software algorithm to them that is executed on a processor comprising one or more CPUS and/or GPUS, wherein each image is taken, i.e. captured, at non-overlapping moments in time. Such image stitching algorithms are known in the art, and are readily available. Each of these images is herein referred to as a sub-image of the panoramic image. FIG. 1 illustrates the generic concept of capturing a panoramic image 102 via a scanning motion of a camera device from right to left. The term "scanning motion" refers to the motion of the camera device, as multiple sub-images are captured as part of the panoramic image.

As can be seen in FIG. 1, a camera device 101, captures a plurality of individual sub-images at a plurality of different instances in time, and these are combined, i.e. stitched together, to form the panoramic image. The field of view of the camera device determines the extent of the physical space that is captured in each sub-image, i.e. each sub-image captures a region of the physical space that is smaller than the region of the physical space that is captured by the panoramic image. The field of view of the camera device refers to the solid angle through which the camera's image sensor is sensitive to electromagnetic radiation (e.g. photons of visible light). The field of view covered by an individual image refers to the field of view of the camera when the image is captured, which depends on the position and orientation of the camera.

In some embodiments, the camera device may capture multiple sub-images of the same region of physical space. That is, the region of physical space that falls within the field of view of the camera device may be captured multiple times before a subsequent sub-image, covering a different region of the physical space, is captured.

FIG. 1 illustrates the field of view of the camera device 101 and corresponding region of physical space that is captured by sub-images 102a, 102b and 102c.

The field of view of the camera device may have a vertical component, x1, and a horizontal component, x2, as shown in FIG. 1b. It will be appreciated that these components may be equal in magnitude or may be different, for example, for a rectangular image, x2 may be larger than x1. It will also be appreciated that, whilst FIG. 1 is shown from the perspective of a user performing a scanning motion from left to right, in reality, a user may perform a scanning motion in any direction, in any of three spatial dimensions. Furthermore, a user may rotate their camera device through any angle, about any axis, or combination of axes, in three spatial dimensions. In most circumstances it is anticipated that the user will wish to capture a panoramic image of the physical space that is in their own field of view, which in turn, is most likely to involve rotating their body, and consequently their camera device, in a manner akin to that shown in FIG. 1 (i.e. about the vertical (x1) axis).

The panoramic image has a wider field of view than any one of the images individually, in the sense that it corresponds to light captured over a greater solid angle—and hence, from a larger spatial area—than any one image alone. In other words, the stitching together effectively widens the field of view of the camera, beyond its physical limitations.

During the capture of a panoramic image (or rather, the individual images), the light (i.e. illumination) output by each luminaire is controlled according to a pattern that isolates the contribution of illumination from each of the luminaires. That is, the light output by each luminaire is controlled in such a manner that, in at least some of the sub-images comprising the panoramic image, the illumination of the region of physical space captured by those images can be identified as originating from a specific luminaire.

The term "contribution of illumination" refers to the light output by a given luminaire that contributes to the illumination of an area of the physical space. The luminaire itself does not necessarily need to be directly visible to a user, in order to provide a contribution of illumination. For example, the contribution of illumination from a luminaire may refer to the illumination cast by that luminaire, on for example a surface, such as a wall, floor or ceiling within the physical space. The user's view of the luminaire itself, e.g. the lamp, may be obscured by a piece of furniture, but the illumination of the surface may still be visible to the user. An area of the physical space may contain a contribution of illumination from more than one luminaire. In general, "contribution" refers to the effect caused by the light interacting with the physical space, and thus depends on the both the luminaire and the physical space in which it is located. The contribution can be viewed as a function of one or more variable illumination characteristics of the light emitted by the luminaire (color intensity etc.) which defines a perceived effect when light with those characteristics interacts with the physical space. It may for example be represented in memory as a distribution of color and/or intensity values (e.g. a distribution of 3D color space vectors) over an area or volume of the physical space, which depends on the color and/or intensity of the emitted light from the luminaire.

Figure 2:
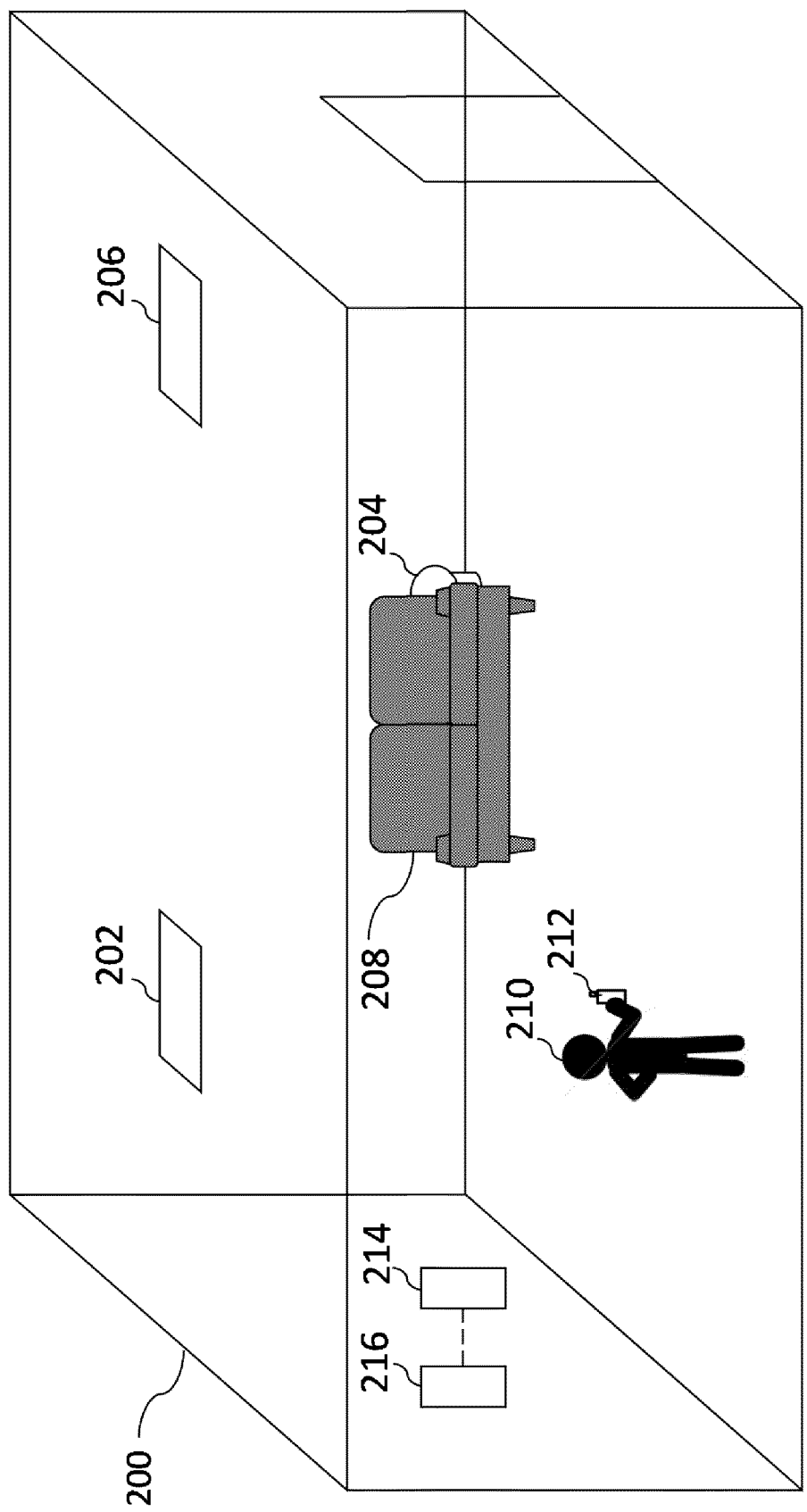
FIG. 2 is a schematic representation of a physical space comprising a lighting system.

FIG. 2 illustrates an example physical space 2 in which three luminaires, 202, 204 and 206 are installed at different locations within the physical space 200. Each luminaire may be fixedly installed at its respective location, or may be a free-standing unit. Generally, the physical space 200 will contain at least two luminaires.

The luminaires are arranged so as together to illuminate a scene within the physical space 200, thereby creating a lighting scene. Note also that each of the terms "luminaire", "lamp" or "illumination source" refers specifically to a device which emits not just any light, but specifically illumination, i.e. light on a scale suitable for contributing to the illuminating of a physical space 200 occupied by humans (so that the human occupants can see within the physical space, and optionally also to create a lighting atmosphere within the environment 2).

A luminaire is a device comprising one or more lamps (i.e. illumination sources) plus associated socket, housing and/or support. A lamp or illumination source may take any of a number of different possible forms such as an LED-based illumination source (comprising one or more LEDs), traditional incandescent bulbs, gas-discharge lamps (e.g. fluorescent tubes), etc. Further, a luminaire may take various forms such as a traditional ceiling or wall mounted room lighting, or a floor-standing or table-standing unit, or a less traditional form such as an LED-strip embedded in a wall or furniture. In the physical space shown in FIG. 2, luminaires 202 and 206 are fixed units installed in the ceiling while luminaire 204 is a mobile luminaire, such as a table lamp, that is located behind an object such as sofa 208. It will be appreciated that whilst only three luminaires are shown in physical space 200, any number of luminaires may be installed at any number of different locations in the physical space 200.

Each of the luminaires is a connected luminaire in that it comprises a receiver configured to receive data from a user terminal 212 for controlling the luminaire, and optionally may also comprise a transmitter configured to transmit data back to the user terminal 212 such as for providing acknowledgements or status updates. The user terminal 212 comprises a corresponding transmitter and optionally receiver respectively. For example, the user terminal 212 may take the form of a mobile user terminal such as a smartphone, tablet or laptop; or a static user terminal such as a desktop computer e.g. to which a peripheral, hand-held camera is connected. Alternatively or in addition, the user terminal may comprise a virtual reality (VR) or augmented reality (AR) device, such as a wearable headset, in which one or more imaging devices are integrated. Such devices can have on-board processing functionality, and thus operate as stand-alone devices; or they may be peripheral devices, which connect to a separate computer device by wired or wireless means.

In embodiments, the AR or VR functionality of an VR or AR device can be exploited to provide additional feedback to the user as he captures the images. For example, the user may wear a VR or AR device and look around the space. In the actual space the lights may be blinking or changing colors (for example), but through the AR or VR device the user can be informed about the contribution of each light and how far he is in capturing the contributions. This application may be particular helpful when in determining the user's predominant field of view, as he can be asked to look forward and then start rotating. Known types of AR/VR devices have all equipment to capture precisely the movement of the user, which can be used in determining the locations of the luminaires and/or their individual contributions.

The user terminal 212 is installed with a lighting control application which is configured so as when run on the user terminal 212 to use one or more transmitters of the user terminal 212 to send data in the form of lighting control commands to each of the luminaires in order to individually control the light that each emits, e.g. to switch the light on and off, dim the light level up and down, adjust the color of the emitted light and/or modulate an identifier onto the emitted light. The lighting control application may optionally also use the receiver of the user terminal 212 to receive data in the other direction from the luminaires, e.g. to receive an acknowledgement in response to a control command, or a response to a control command that requested a status update rather than controlling the emitted light.

This communication between the application on the user terminal 212 and each of the luminaires may be implemented in a number of ways. Note that the transmission from user terminal 212 to luminaire may or may not be implemented in the same way as any transmission from luminaire to user terminal 212. Note also that the communication may or may not be implemented in the same way for the different luminaires. Further, the communications may be implemented wirelessly or over a wired connection, or a combination of the two. Some examples are set out below, each of which may in embodiments be used to implement any of the communications discussed herein. In each case the user terminal 212 may be described as communicating with the luminaires via a wireless and/or wired network, either formed by or comprising the user terminal 212 and luminaires.

In some embodiments, the user terminal 212 is configured to communicate directly with each of one or more of the luminaires, i.e. without communicating via an intermediate node. For example, the user terminal 212 may be a wireless terminal configured to communicate directly with each of the luminaires via a wireless channel, e.g. a ZigBee channel, thus forming a wireless network directly between the user terminal 212 and luminaires 202, 204 and 206. In another example, the user terminal 212 may be configured to communicate directly with the luminaires over a wired network, such as a DMX network if the user terminal 212 is itself a DMX controller.

Alternatively or additionally, the user terminal 212 may be configured to communicate with each of one or more of the luminaires via at least one intermediate node in the form of at least one bridge, gateway, hub, proxy or router 214. For example, the user terminal 212 may be a wireless terminal configured to communicate with such luminaires via a wireless router, e.g. a Wi-Fi router, thus communicating via a wireless network such as a Wi-Fi network comprising the wireless router 214, user terminal 212 and luminaires 202, 204 and 206. As another example, the intermediate node 214 may comprise a wired router such as an Ethernet router, the user terminal 212 being configured to communicate with the luminaires via a wired network such as an Ethernet network comprising the wired router, user terminal 212 and luminaires. In yet another example, the intermediate node 6 may be a DMX proxy.

In further alternative or additional embodiments, the user terminal 212 may be configured to communicate with each of one or more of the luminaires via an intermediate node in the form of a centralized lighting control unit 216. Such communication may or may not occur via a router 214 or the like, e.g. Wi-Fi router (and the connection between the control unit 216 and router 214 may be wired or wireless). Either way, the control unit 216 receives control commands from the user terminal 212, and forwards them to the relevant one or more luminaires to which the commands are directed. The control unit 216 may be configured with additional control functionality, such as to authenticate whether the user terminal 212 and/or its user 210 is/are entitled to control the lights, and/or to arbitrate between potentially conflicting commands from multiple users. Note therefore that the term command as used herein does not necessarily imply that the command is acted on unconditionally (though that is not excluded either). Note also that in embodiments, the commands may be forwarded to the destination luminaire in a different format than received from the user terminal 8 (so the idea of a sending a command from user terminal 212 to luminaire refers herein to sending the substantive content or meaning of the command, not its particular format or protocol). One example of a suitable control unit is the Phillips Hue bridge.

Thus by one or more of the above means, the user terminal 212 is provided with the ability to communicate with the luminaires in order to control them remotely, including at least to control the light they emit. It will be appreciated that the scope of the disclosure is not limited to any particular means of communication.

By whatever means the communication is implemented, the lighting control application on the user terminal 212 presents the user 210 of that terminal with a suitable user interface for selecting the manner in which the user 210 desires that the light emitted by the luminaires is controlled.

Figure 4:
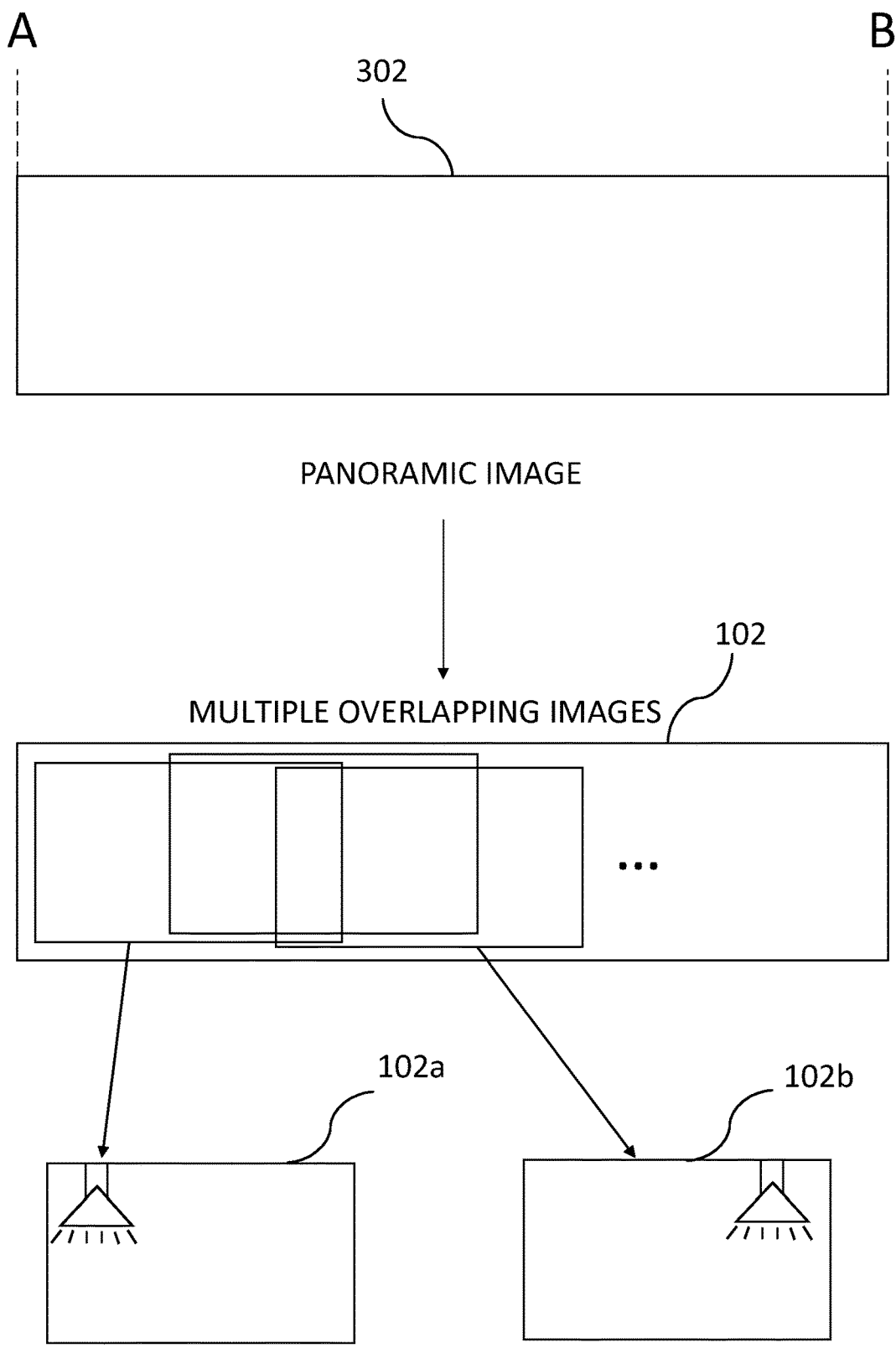
FIG. 4 is a schematic illustration of the interaction of luminaires with the camera device, during the capture of a panoramic image.

FIG. 4 illustrates the process of recording a panoramic image with the stitching of individual sub-images (i.e. photos) and the interaction with the luminaires during the capture of those images.

In FIG. 4, the top section (I) shows a panoramic image 302 with edges A and B, which can be the same edge (e.g. in a 360 degree image), but need not be (e.g. in a 120 degree image).

The middle section (II) of FIG. 4 illustrates that the panoramic image is a stitched image, i.e. it is made by taking individual images (collectively, 102) in sequence in time. The images that are stitched will usually be overlapping, to allow for easier stitching. In applying the invention the overlap can be beneficially used as explained below.

The bottom section (III) of FIG. 4 illustrates that in individual images 102a, 102b, different luminaires can be controlled to emit light. For example, when a user captures a panoramic image from left to right:

first lamp L1 on the left is turned on, and one or more images are captured as the user starts panning the camera to the right;

next lamp L1 is turned off and lamp L3 is turned on, and a further one or more images are captured as the user continues panning the camera all the way to the right.

In this scenario, if lamp L1 illuminates only area A1 and lamp L3 illuminates only area A3, and these areas A1 and A3 do not overlap, then in the stitched panoramic image the contribution of each lamp can be determined. Both lamps could in fact be turned on at the same time, the benefit of controlling them in sequence can lie in providing feedback to the user. For example, the speed at which the user needs to pan the camera can be indicated by the emission of light from the lamps that are turned on in sequence. For example, when L1 is turned on this indicates to the user that this lamp should be in (the center of) the picture and when subsequently lamp L3 is turned on (whether or not L1 is turned off) indicates to the user that (s)he should have panned or continue panning to ensure that L3 is in (the center of) the picture.

If areas A1 and A3 do overlap however, then when the overlapping area (A2) is captured in a single image only, both lamps need to be on to determine their total contribution, yet their individual contribution cannot be determined if they emit the same light effect. It may be possible to estimate the contribution of lamp L1 in area A2, based on a light emission pattern detected in the images captured of are A1. By controlling the lamps to provide distinguishable light effects (e.g. emitting different colors of light, coded light) the individual contributions can be determined to a greater extent. Embodiments of this nature are described in more detail, later on in the specification.

In some embodiments, when there is overlap in the images that are captured and the same region in the area (e.g. room) is captured multiple times the lamps can be controlled to emit light effects in sequence. If images 1 and 2 are taken in sequence of area A2, then lamp L1 can be on while image 1 is taken (and L2 is off); and lamp L2 can be on when image 2 is taken. Lamp L1 can be either off or on during the capture of image 2. If lamp L1 is off, then all of the light captured comes from L2. Otherwise, if L1 is on, the difference in light level is caused by L2. The contribution of L2 can thus be determined by subtracting the contribution of L1 (which is known from image 1) from the total contribution in image 2. In the present state of the art, it is well known that analyzing multiple images of a physical space under different conditions (day, night, blinds open, blinds closed) can be used to determine for a lighting space, both the ambient light contributions and the artificial contributions of each luminaire for that space.

Figure 5:
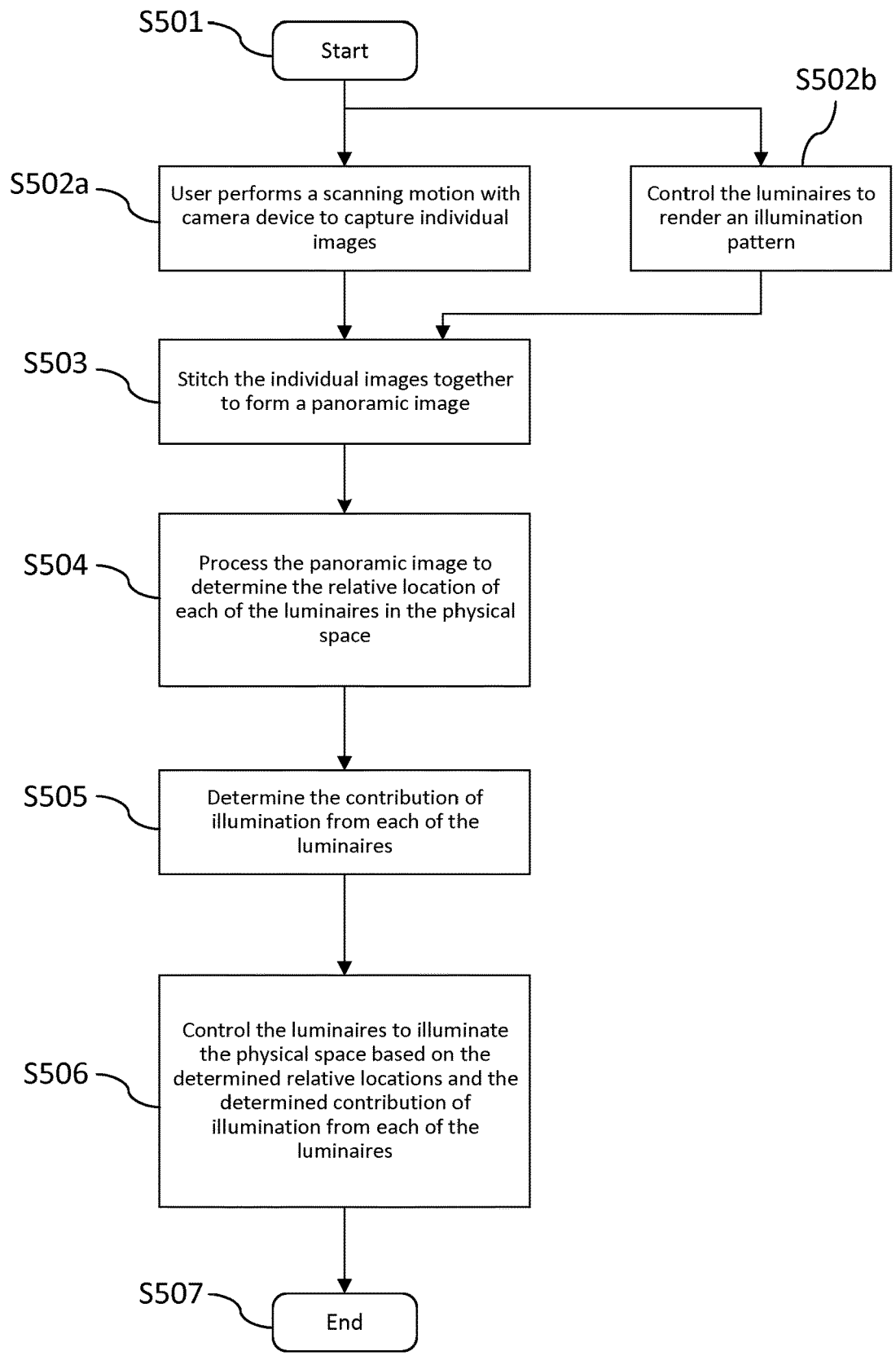
FIG. 5 illustrates the method steps for implementing embodiments of the invention of the present disclosure.

FIG. 5 shows a flow chart for a method of controlling the light output by a plurality of luminaires and determining the contribution of illumination from each of them.

The process begins at step S501.

At step S502a a user performs a scanning motion with their camera device so as to capture a plurality of individual sub-images. The scanning motion may be predetermined and instructed to a user, e.g. the user may be required to move their camera device through a predetermined angular range. This angular range may be indicated to the user via the display of their user device (e.g. by overlaying an indicator over the images being captured) or by the luminaires themselves (e.g. by switching them on or off, depending on whether they should appear in an image being captured). In alternative embodiments, the user may be free to perform any scanning motion and the angular range through which the camera device has been moved, may be mapped by the lighting control application, using sensor and/or image data.

At step S502b, each of the luminaires are controlled so as to render an illumination pattern. This step occurs in parallel, i.e. simultaneously with step S502a.

The capture of the plurality of sub-images may be synchronized with the rendering of the illumination pattern. For example, if the order of the luminaires in the physical space is known, e.g. from left to right, the luminaires may be controlled in sequence as the panoramic image is captured (e.g. as the user moves their camera device from left to right). As the user points the camera to the left in the physical space, the luminaire in that section is controlled and next the one in the middle and on the right—as the user pans the camera across the physical space.

As the scanning motion is performed by the user (step S502a), the movements of the camera device may be tracked using image data received from the camera and/or sensor data received from a separate sensor coupled to the camera. This data, in turn, may be used to control the illumination pattern that is rendered at step S502b. For example, the tracking may comprise determining, at each of a plurality of times during the scanning motion, which of the luminaires is located closest to an optical axis of the camera device at that time and controlling that luminaire, so as to isolate its contribution, at that time. Different types of illumination pattern are described in more detail, below.

In some embodiments, the luminaires may be controlled so as to render a static illumination pattern. That is, the number or combination of luminaires that are switched on during the capture of the panoramic image, may remain constant with time.

For example, in one embodiment, at least two of the luminaires may be controlled so as to emit light of a different color, such as a different primary color. If each luminaire emits light of a different primary color, the contribution of illumination from each of the luminaires may be determined by identifying regions of the physical space that are illuminated by light of a particular primary color. The same function can be achieved using non-primary colors, by applying suitable color image processing, if the color output of the luminaires is known.

In the example of FIG. 2, luminaire 202 may be set at primary red, luminaire 204 may be set at primary green and luminaire 206 may be set at primary blue. The control unit 216 may transmit a signal to each of the three illumination sources to ensure that each luminaire emits light of a different primary color.

In alternative embodiments, rendering a static illumination pattern may comprise controlling at least one of the luminaires to emit light in which an identifier for that luminaire is modulated, i.e. to emit coded light, in which an identifier of the light source is coded. For example, in one embodiment, each of the luminaires may be controlled so as to emit coded light at the same time. Each of the respective luminaires may then be identified, as and when the user's camera device encounters each luminaire, and an application running at that, or a connected device, extracts the associated identifier.

In alternative embodiments, the illumination pattern may be a dynamic illumination pattern that varies as the panoramic image is captured. The illumination pattern may be varied so as to isolate the contribution of illumination from each of the luminaires. The dynamic illumination pattern may be rendered in response to a detection that a user has started to perform a scanning motion with their camera device. For example, an application running at the user device may transmit a signal to the control unit 216, in response to detecting that a user has initiated a panoramic image capturing mode and that the camera device has been moved, whilst in that mode.

In some embodiments, rendering the dynamic illumination pattern may comprise varying the intensity of light emitted by at least two of the luminaires, such that in at least two of the sub-images captured as part of the panoramic image, a different combination of intensities from each of the luminaires is captured.

For example, the dynamic illumination pattern may ensure that a first luminaire is in an emitting state (i.e. switched on and emitting light) and that a second luminaire is in a non-emitting state (i.e. switched off and not emitting light), when a first sub-image is captured. As the user captures a second sub-image, the dynamic illumination pattern may ensure that the first luminaire is in a non-emitting state and that the second luminaire is in an emitting state.

The dynamic illumination pattern may vary the number and/or combination of luminaires that are switched on or off, at a given point in time, during the capture of the panoramic image. The number, or combination of luminaires that are switched on at a given point in time may depend on the scanning motion performed by the user. For example, whether a given luminaire is switched on or off may depend on whether that luminaire is expected to appear in an individual sub-image that is being captured at step S502a. In this way, the illumination pattern rendered at step S502b is (to an extent) synchronized with the images being captured at step S502a. This specific embodiment is described in more detail, later.

In alternative embodiments, a dynamic illumination pattern may be rendered by varying the color of light emitted by at least two of the luminaires, such that in at least some of the plurality of images, a different combination of colors from each of those luminaires is captured.

If the physical space contains more than three luminaires, it is still possible to isolate the contribution of illumination from each of them by causing each luminaire to emit light of a different primary color. Though in some cases additional measures are needed to separate the contributions. If two or more of the luminaires emit light of the same primary color, the detection of a primary color in one or more of the sub-images can no longer be ascribed to a single luminaire. If two adjacent luminaires emit the same primary color and contribute to the illumination of the same region of the physical space, additional measures can be used to identify the presence of two separate luminaires, based on an image of that region of space.

For example, where there are more than three luminaires in the panoramic image, the illumination sources may cycle through a random sequence of color change between the primary colors. Hence, if two adjacent luminaires happen to be set at the same primary color, during the next color setting, e.g. after 1 s, the two luminaires are more likely to be at a different color setting. This ensures that a different combination of color from each of the luminaires is captured in at least some of the plurality of images comprising the panoramic image and hence, that the contribution of illumination from each of them be distinguished (i.e. identified) as originating from separate luminaires.

In alternative embodiments, the dynamic illumination pattern may control the emitting state of each of the luminaires to ensure that each luminaire emits coded light, as and when it is being captured by one or more sub-images. The dynamic illumination pattern may ensure that luminaires do not emit coded light, if they do not (or are not expected to appear) in a sub-image that is being captured. In this way, the illumination pattern rendered at step S502b is synchronized with the images captured at step S502a.

In some embodiments, as the user moves their camera device to a new position (i.e. as the user performs the scanning motion), the camera device may capture multiple sub-images of the region of physical space that falls within the field of view of the camera device, when the camera device is at that position. That is, at least two of the sub-images captured at different points in time may cover the same region of the physical space.

The dynamic illumination pattern may vary the intensity of light output by each of the luminaires such that a sub-image is captured of the (same) region of physical space for each luminaire, where only that luminaire is in an emitting state. Thus, each of the multiple sub-images of a particular region of the physical space will contain a contribution of illumination from a single, but different luminaire. This is another way in which the illumination pattern rendered at step S502b may be synchronized with the images being captured at step S502a. This specific embodiment is described in more detail later, in reference to FIG. 6.

At step S503, the individual images captured at step S502a are stitched together to form one or more panoramic images. As mentioned previously, the field of view of the panoramic image covers a wider field of view than the individual sub-images.

At step S504, the one or more panoramic images are processed so as to determine the relative positions of each of the luminaires in the physical space. Existing techniques can be used to achieve this—e.g. it is well known in the art, for example, that an electronic floor plan can be generated for a physical space, by capturing a panoramic image of that physical space (e.g. using Sensopia MagicPlan).

The relative position of each of the luminaires within the physical space may be determined based on the relative positions of each of the identified luminaires in the panoramic image. In other words, the panoramic image provides a mapping between the locations of the luminaires in the physical space and the locations of the illumination sources in the panoramic image. The user does not need to manually indicate the position of the lights in the panoramic image, or manually assign which luminaire in the panoramic image corresponds to a specific luminaire with a specific communication address in the lighting control system. Nevertheless, the possibility of using manual input in identifying the luminaires is not excluded.

At step S504, the panoramic image is used to extract the locations of the luminaires, in the physical space—e.g. to create a floor plan of the luminaires, or any other form of two or three dimensional map denoting the relative locations of the luminaires within the physical space within the wide field of view covered by the panoramic image.

At step S505, a contribution of illumination from each of the luminaires is determined based on the individual images captured at step S502a during the rendering of the illumination pattern at step S502b.

A contribution of illumination from a particular luminaire may be determined by determining a shape, a size and/or a location of at least one illumination footprint cast by that luminaire on a surface of the physical space, during the rendering of the illumination pattern. A luminaire may cast an illumination footprint in the sense that the illumination cast by that luminaire can be distinguished from the illumination cast by other luminaires. Each of the individual sub-images may be processed so as to determine the regions of the physical space that contain an illumination footprint from a particular luminaire.

At step S506, the determined relative positions of each of the luminaires and the determined contribution of illumination from each of them is used to render a lighting scene/effect selected by a user.

The process ends at step S507.

In certain embodiments of the present disclosure, the contribution of illumination from each of the luminaires may be determined based on the capture of two panoramic images. Such an embodiment is described in detail below.

Figure 3:
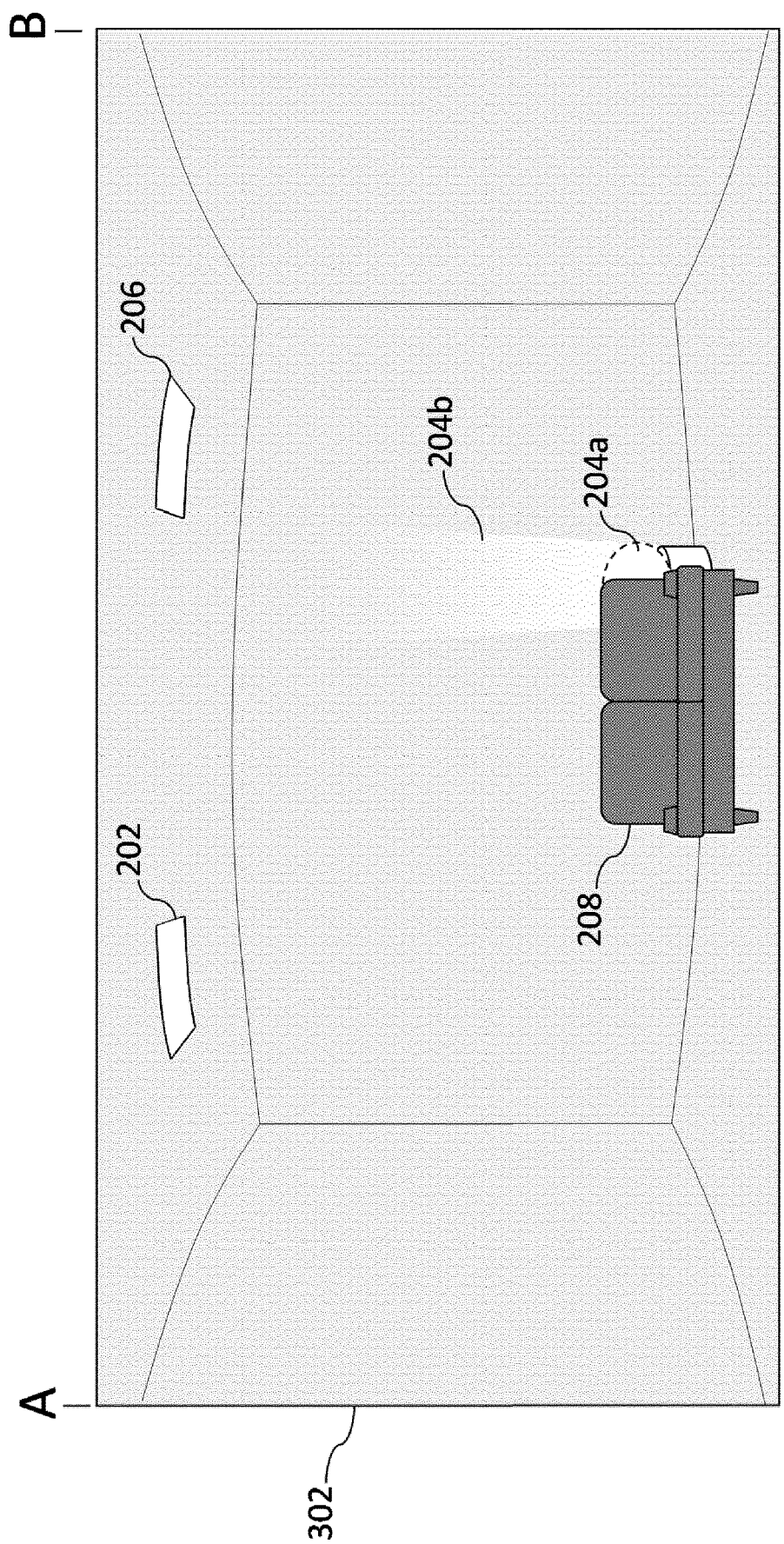
FIG. 3 is a schematic representation of a panoramic image of a physical space that is illuminated by a plurality of luminaires.

During the capture of the first panoramic image, the application running at the user device ensures that all of the luminaires are switched on. This is shown in FIG. 3.

As described previously, the relative locations of each of the luminaires in the physical space may be determined based on the relative locations of the luminaires in the panoramic image. For example, the panoramic image may contain brighter and darker regions, corresponding to regions of the physical space that are more and less illuminated by the various luminaires. The application may identify the presence of separate luminaires based on the different locations within the panoramic image at which the brighter (or brightest) regions occur.

In addition to processing the panoramic image, the application may process each individual sub-image so as to determine another parameter from which the relative location of each of the luminaires in the physical space can be determined.

For example, each sub-image captured by the camera device may be associated with a timestamp, corresponding to a point in time at which that sub-image was captured relative to the point in time at which the user began performing the sweeping (i.e. scanning) motion with their camera device.

The application may identify, for each luminaire identified in the panoramic image, the sub-image in which a contribution of illumination from that luminaire is at a maximum in intensity. The timestamp associated with this sub-image may correspond to the time at which a user was directly facing that luminaire (i.e. the luminaire was at the center of the user's/camera's field of view).

For each of the sub-images that correspond to a maximum in the intensity of light captured from a particular luminaire, the application may log, i.e. store, the associated timestamp. By doing so, the application can determine when the user encountered each of the luminaires. For example, the application may determine, that a first, second and third luminaire was encountered by a user at respective times of 0.5 s, 1.5 s and 2.5 s, during the capture of the first panoramic image.

Alternatively, the application may determine the relative position of each of the illumination sources within the panoramic image based on an orientation and/or location of the camera device during the capture of the first panoramic image. For example, each sub-image captured by the camera device may be associated with a gyrometer position of the camera device, where the gyrometer position provides an indication of changes to the location and/or orientation of the camera device, relative to the location and/or orientation of the camera device at the beginning of the panoramic scan.

The application may log (i.e. store) the gyrometer positions of the camera device for the sub-images in which a contribution of illumination from a particular luminaire is identified as being at a maximum in intensity. These gyrometer positions may correspond to the location and/or orientation of the camera device, when the user was directly facing the luminaire, during the capture of the first panoramic image.

In alternative embodiments, each luminaire may emit coded light in which an identifier for that luminaire is coded. A plurality of sub-images of each luminaire may be captured and each of the sub-images may be compared so as to extract the identifier for that luminaire. Each identifier may be unique to its respective luminaire. The application may log the times at which an identifier is extracted for each individual luminaire, and use this to determine when a user is likely to encounter that luminaire, during the capture of a second panoramic image.

Following the capture of the first panoramic image, the application may then prompt the user to capture a second panoramic image. The sweeping motion performed by the user during the capture of the second panoramic image should match the sweeping motion performed by the user during the capture of the first panoramic image, and should cover a substantially similar field of view of the physical space. This is because the relative position of each of the luminaires within the physical space has been determined based on the timestamps/gyrometer positions of the user device during the capture of the first panoramic image.

The illumination pattern rendered by the luminaires will depend on the relative locations of the luminaires, as identified in the first panoramic image, as described above.

Based on the timestamps/gyrometer positions for each identified luminaire, the application may determine whether a sub-image that is being captured as part of the second panoramic image corresponds to region of the physical space in which a luminaire is expected to appear and provide a dominant contribution of illumination. If the sub-image being captured does correspond to a sub-image in which an identified luminaire is expected to appear and provide a dominant contribution of illumination, the application may ensure that all other luminaires are switched off, and that the only contribution of illumination is from the luminaire that is expected to appear in the sub-image being captured.

For example, if the timestamps logged during the capture of the first panoramic image (as described above) are used to control the intensity of light output by each of the luminaires, the application may ensure that each luminaire is only switched on for a small period of time, around the time at which a user is anticipated to encounter that luminaire, during the capture of the second panoramic image.

Returning to the previous example described above, the application may ensure only the first luminaire is switched on at approximately 0.5 s (e.g. ±0.07 s), that only the second luminaire is switched on at approximately 1.5 s (e.g. ±0.07 s), and that only the third luminaire is switched on at approximately 2.5 s (e.g. ±0.07 s). Here, as before, the times refer to the time elapsed since beginning the capture of the panoramic image.

The individual images captured as part of the second panoramic image can then be processed so as to determine the individual contributions from each of the luminaires in illuminating the physical space.

In some embodiments, the application may indicate to the user, during the capture of the second panoramic image, how fast the user should perform the sweeping motion with the camera device. For example, an icon, such as an arrow, may be presented on the display of the user's camera device to indicate whether the user should move (e.g. rotate) the camera more quickly or slowly.

Additionally or alternatively, the luminaires themselves may be used to provide an indication of how quickly the user should move the camera device. For example, the switching off of a luminaire may indicate to a user that the user should rotate their camera device away from that luminaire. Conversely, the switching on of a luminaire may indicate to a user that the user should rotate their camera device towards that luminaire.

In some embodiments, the two panoramic images may be captured continuously in a single movement. For example, the user may be asked to start capturing a panoramic image from the middle of the panoramic image (i.e. at the center of the field of view of the physical space that they intend to capture). The user may then be asked to move their camera device to the utmost right and the utmost left of the panoramic image, before moving the camera device back to the center. In this way, each area of the physical space is captured twice, whilst not giving the user the feeling of a two-step process.

It should be noted that, in the embodiment in which each of the luminaires emits light of a different primary color, a single panoramic image is sufficient for determining the contribution of illumination from each of the illumination sources. This is because the application running at the user device can distinguish between the different primary colors that appear in the panoramic image, and can therefore determine which regions of the physical space contain a contribution from a specific luminaire.

In a further, alternative embodiment, the contribution of illumination from each luminaire may be determined based on the capture of a 'single' panoramic shot, wherein sub-images of the same region of physical space are captured multiple times. Here, the term 'single' refers to the fact that a user is required to perform a single sweeping motion, e.g. from left to right. Thus, to the user, it feels as if a single panoramic image is being captured. In reality, multiple panoramic images may be generated by the application based on the single sweeping motion performed by the user. This is described below, in relation to FIG. 6.

Figure 6:
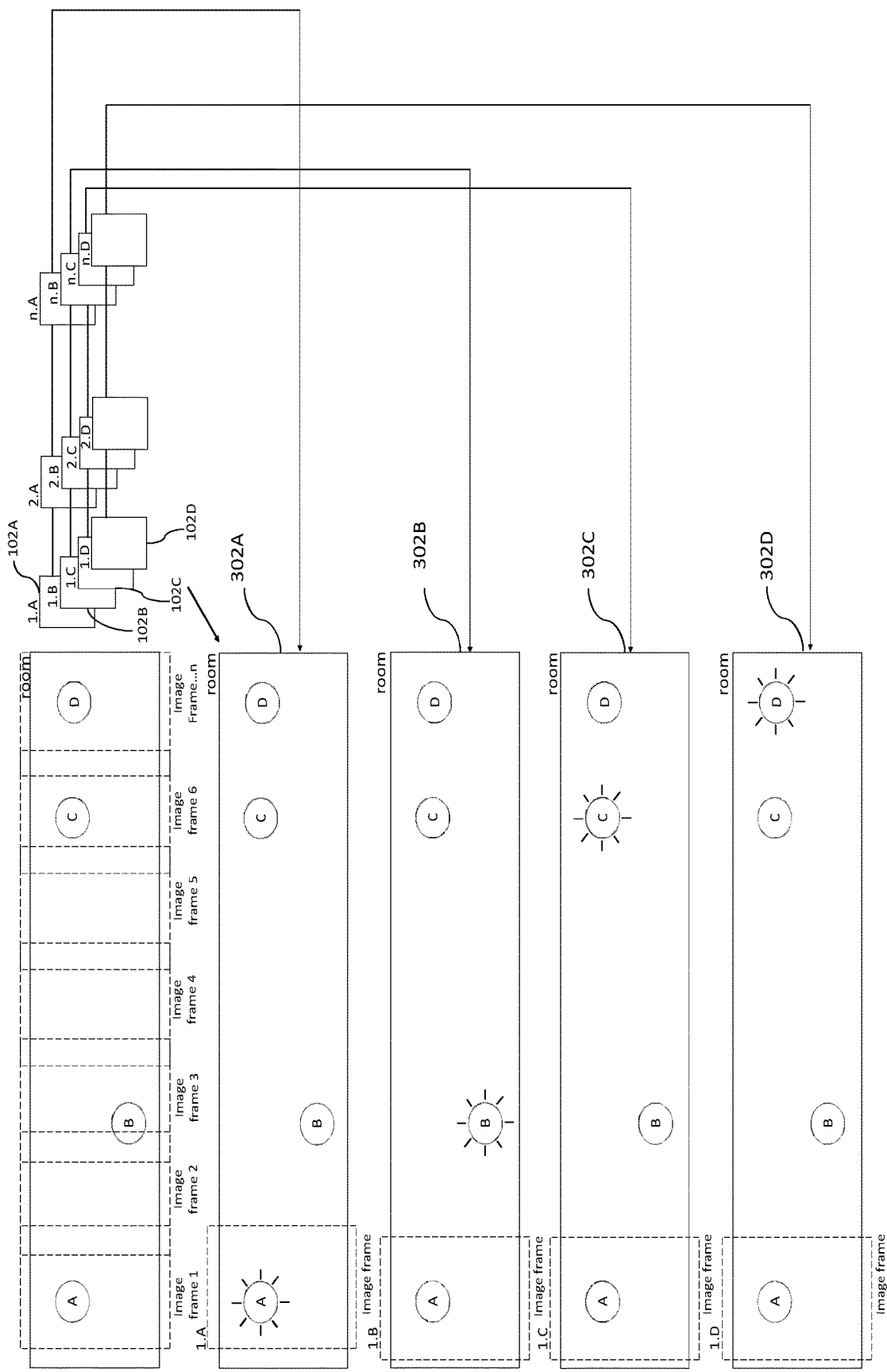
FIG. 6 illustrates a schematic representation of the capture of a single panoramic image, wherein each region of the physical space is captured multiple times.

As can be seen in FIG. 6 a user is in a physical space with luminaires A, B, C and D. The application prompts the user to capture a panoramic image at a slow pace, e.g. by prompting the user to slowly sweep their camera device from left to right, as shown in FIG. 6.

During the capture of the panoramic image, the user first encounters luminaire A. The application ensures that the light output of luminaire A is on and that all of the other luminaires (B, C and D) are switched off. The application then captures sub-image 1.A. Subsequently, the application ensures that the second luminaire (B) is switched on and that all of the other luminaires (A, C and D) are switched off. The application then captures sub-image 1.B.

Following this pattern, the application then ensures that the third luminaire (C) is switched on and that all of the all the other luminaires (A, B and D) are switched off. The application then captures sub-image 1.C.

Finally, the application ensures that luminaire D is switched on and that all of the other luminaires (A, B and C) are switched off. The application then captures sub-image 1.D.

During the captures of images 1.A-1.D the camera device remains stationary i.e. the same region of physical space is captured in images 1.A-1.D).

As the user moves their camera device from left to right, the above cycle is repeated. Hence, for every position of the camera device during the capture of the panoramic image, the same number of sub-images are captured as there are luminaires in the physical space. For example, if there are five luminaires in the physical space, five sub-images are captured each time the user moves the camera device to a new position, whilst performing the sweeping motion described previously.

This process generates, for each relative position of the camera device within the panoramic scan, all of the permutations where only one of the luminaires is switched on at a time, and all the other luminaires are switched off. In other words, for each relative position of the camera device within the panoramic scan, each of the sub-images captured at that position contain a contribution of illumination from a single but different luminaire.

In the example illustrated by FIG. 6, four sets of individual images 102A-102D are captured at points in time in an interleaved fashion, in a single scan. By separating out the sets of individual images 102A-102D from each other, a panoramic image is generated for each set. In the example of FIG. 6, this results in the generation of four panoramic images 302A-302D, where each panoramic image comprises the individual images from the corresponding set.

The number of luminaires located within the physical space is typically known by the control unit 216 (e.g. 3 lamps in the living room, two lamps in the bedroom) and can therefore be used to determine the number of sub-images that are captured for each relative position of the camera device during the panoramic scan.

The application may be aware of the order (i.e. sequence) in which each of the luminaires are switched on, and may use this to determine identify the luminaire that provides a dominant contribution of illumination to the region of physical space that is being captured. For example, a comparison of images 1.A-1.D may reveal that image 1.A contains light of the highest intensity, and therefore, that luminaire A provides the dominant contribution of the illumination of this region of the physical space.

The application may generate an individual panoramic image for each luminaire by stitching together each of the sub-images in which that luminaire was switched on. This is shown in FIG. 6. For example, a panoramic image for luminaire A can be generated by stitching together images 1.A, 2.A ... n.B, where n is equal to the number of different positions of the camera device, during the capture of the 'single' panoramic image. The contribution of illumination from luminaire A can therefore be determined, based on the regions of the physical space that are illuminated, in that panoramic image.

In an alternative embodiment, whenever a new luminaire is encountered during the capture of the panoramic image, the application may indicate to the user to keep scanning backwards and forwards (e.g. left and right) around the position of the lamp in the panoramic image (while the lights in the room are toggled on and off) until the right lamp at the position in the panoramic image scan has been toggled. This process hence identifies the lamp at the current position in the panoramic scan.

There may be situations where a certain luminaire (e.g. LivingColors behind a sofa) is not visible, however the lighting effect (wall washing of the room corner) is still contributing to the lighting effect enjoyed from the end-user's point-of-view. This is shown at 204b in FIG. 3. The application may facilitate the identification of these luminaires by allowing the user to aim their camera device at the area of the physical space that is illuminated by this luminaire, and the application may prompt the user to manually record the type and mechanical height of the luminaire (e.g. floor standing Living colors wall washer).

To localize to which lamp the user's camera device is pointing to at each sub-image during the panoramic scan, each luminaire may be coupled with an indoor localization system; for example the localization may be based on Ultra-Wide-Band technology. Each luminaire may be integrated with one or more localization devices, such as beacons integrated into the lamp, which enable the smart phone to discern to which lamp the smart phone is pointing to. Alternatively, the localization devices may be independent from the luminaires themselves.

In alternative and/or additional embodiments, a laser or 3D camera be used for mapping the surrounding space from the viewpoint of the end-user in place, or in addition to, the conventional camera 101. Moreover, in place of the panoramic image 302, a moving image (e.g. a video file or video files) may be generated from at least some of the images captured during the scan.

A use-case in which the above described techniques can be used is to identify the luminaires that fall within the field of view of a stationary user. This, in turn, may be used to control the luminaires that fall within that field of view.

Figure 7:
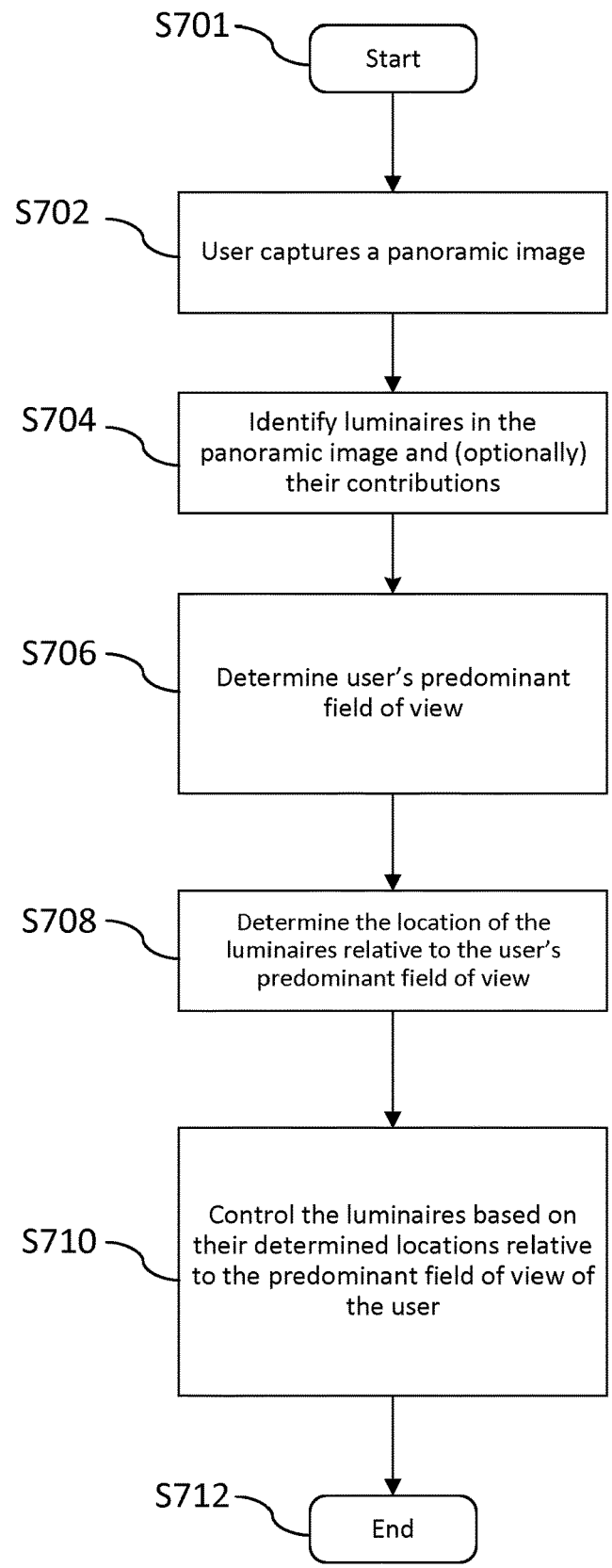
FIG. 7 illustrates a series of method steps for controlling a plurality of luminaires, based on a field of view of a user.

FIG. 7 illustrates a series of method steps for controlling a plurality of luminaires, based on a field of view of a user.

The process starts at step 701.

At step 702, a stationary user captures a panoramic image by rotating their camera device. As the camera device is rotated, multiple fields of view are captured, each field of view corresponding to the field of view of the camera device, at that particular angle of rotation.

Figure 8:
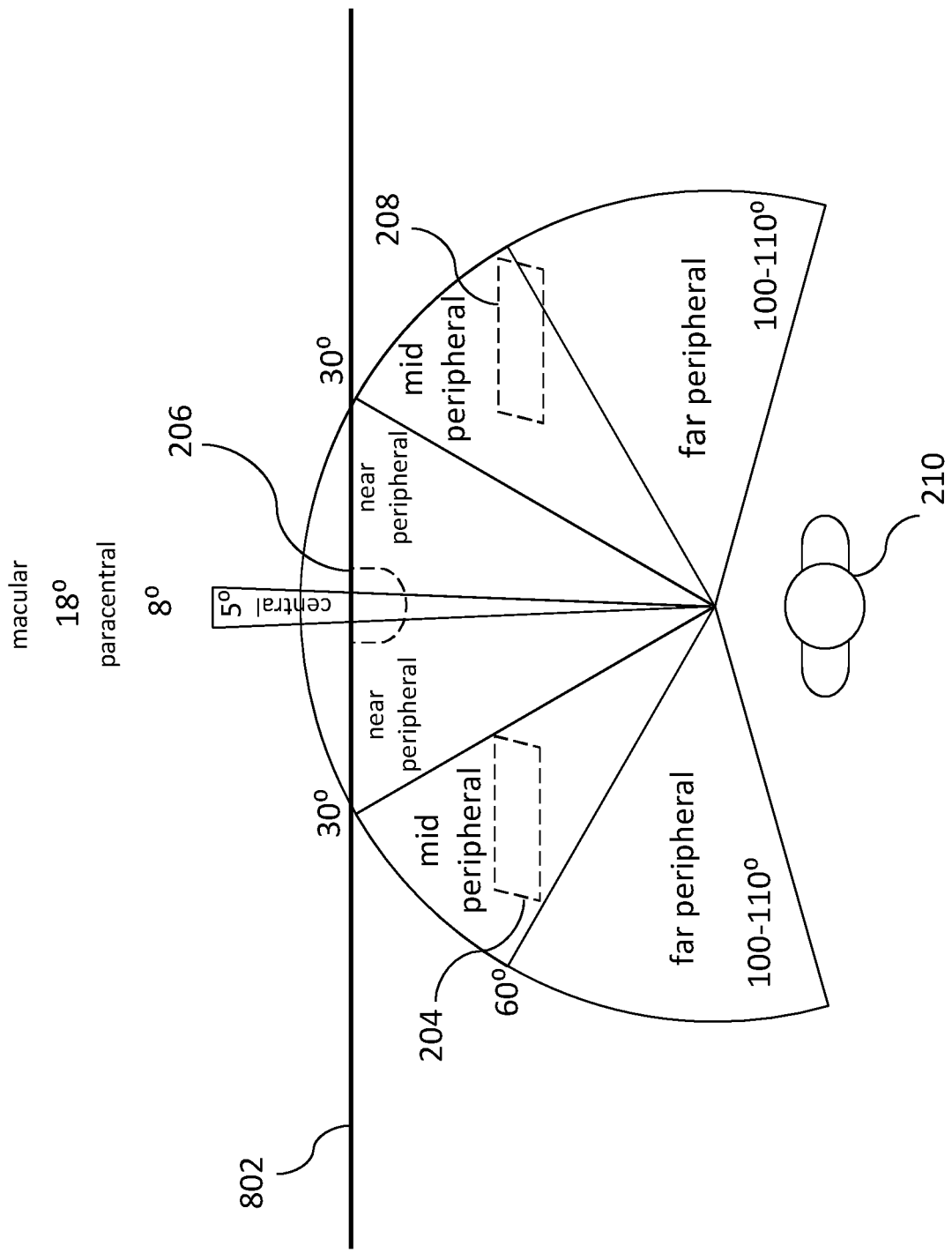
FIG. 8 shows a user's predominant field of view.

The field of view of the camera device covers an angular extent (i.e. volume) of the physical space. The angular extent of the physical space captured by the camera device can be defined as an angular range relative to an axis, such as e.g. the optical axis of the lens. This is shown in FIG. 8. The angular range covered by the panoramic image is greater than the angular range covered by the individual images (thus, the panoramic image has a larger field of view than the individual images).

The field of view of the panoramic image may also be greater than the field of view of the user capturing the panoramic image. For example, the panoramic image be a 360° panoramic image (and therefore cover an angular range of 360°). In some embodiments, the user may be instructed to rotate their camera device through a predetermined angular range, e.g. 360°. Hence, the scanning motion may correspond to the rotation of the camera from an initial expected orientation (e.g. 0°) to another expected orientation (e.g. 360°).

In order to determine which of the luminaires within the physical space fall within the user's predominant field of view, the panoramic image is processed so as to determine the predominant line of sight of the user. The predominant line of sight of the user is the line of sight of the user that lies along his/her predominant facing position, when adopting the stationary position, as the panoramic image is captured. For example, the predominant line of sight of the user may be determined by assuming that a user is at the center of the panoramic image (e.g. for a non 360° image), or at the edge of the panoramic image (e.g. for a 360° image).

Additionally or alternatively, the predominant line of sight of the user may be determined based on image analysis. For example, if a TV is in the macular vision area, then the center of the TV may be set to the 0° point. In this specific example it is assumed that a user is capturing a panoramic image from the comfort of their sofa, in front of a sofa, and that it is from this position within the physical space that the user intends to control the luminaires from.

In alternative embodiments, a user may be asked to manually select an area on the panoramic image that corresponds to their predominant line of sight.

In preferred embodiments, the predominant line of sight is identified automatically, based on analysis of the panoramic image. In some embodiments, a user may be asked to confirm whether the predominant line of sight identified by the application (by processing the panoramic image) is correct, before the luminaires in the user's field of view are identified. For example, the center of a TV in the panoramic image may be highlighted to indicate that this has been identified as corresponding to the predominant line of sight of the user.

In order to determine which of the luminaires fall within the user's predominant field of view (i.e. the relative location of the luminaires relative to the predominant field of view of the user), the angular range covered by the panoramic image will also need to be determined. The angular range can be acquired from the panoramic image—e.g. based on EXIF data directly included in the panoramic image; indirect EXIF data based on camera type; may be assumed to be 70°—as is standard for a click and point shoot camera; or may be acquired from the user.

At step 704, the luminaires in the panoramic image are identified and (optionally) the contributions from each of them are determined. This is done as described above, in relation to FIG. 5.

At step 706 a predominant field of view of the user is determined. The predominant field of view of the user corresponds to the field of view of the user in the user's predominant facing direction, to which he/she is naturally incline when in the stationary position.

FIG. 8 shows a plan view of the user 210 for his predominant facing direction, on which his predominant field of view is indicated by a set of angular ranges defined relative to the user's predominant line of sight LOS (i.e. his line of sight when in his predominant facing direction). A macular vision region ("center gaze region") is shown, corresponding to an angular range of about 0 to 18 degrees from LOS for an average human. The macular region is defined by the macula of the user's retina. Light from objects in the macular region falls directly on the user's macula, such that they appear relatively sharp and detailed to the user when the user is adopting his predominant facing direction. Sub-regions of the macular region are shown: a paracentral region (0 to 8 degrees), and a central region (0 to 5) degrees which is also a sub region of the paracentral region. Beyond the macular region, a peripheral vision region is shown, corresponding to an angular range of about 18-110 degrees for the average human. Three sub-regions are shown: the near peripheral region (18 to 30 degrees), mid peripheral (30 to 60 degrees) and far peripheral (60 to 100 degrees). Light falling from objects in these regions still falls on the user's retina, but not directly on the retina such that these objects are perceptible but appear less sharp and detailed. Outside of the peripheral region, i.e. at angles greater than about 110 degrees for the average human (which includes the space behind the user's head—360 degrees corresponding to a line directly behind the user 210), objects are not visible to the user. Note that, as the user turns his head or looks up, down or to one side, his field of view changes—but the user has a natural tendency to return to his predominant facing direction, hence it is his predominant field of view that is most pertinent to his experience of the lighting system. Whilst only one angular dimension is shown in FIG. 8, the predominant field of view may be defined by two dimensional angular ranges about LOS (e.g. polar and azimuthal coordinate pairs).

Determining the user's predominant field of view comprises determining the predominate line of sight LOS, which corresponds to a point in the panoramic image that can be identified in a number of ways (see below). This can be entirely automatic, or determined by a manual selection of this point by the user. In addition, determining the user's predominant field of view may comprise identifying at least one area of the image corresponding to an angular range (which may be one or two dimensional) across all or a part of to the user's field of view, relative to the predominant line of sight LOS—e.g. in the simplest case an area or areas of the image corresponding to the whole field of vision (macular vision region plus peripheral vision region), or a part of it (e.g. just the macular region), or a respective area or areas for each of multiple vision regions (e.g. macular and peripheral vision regions separately) at any granularity (e.g. separate areas may be determined for two or more of the central, precentral, near peripheral, mid peripheral, and far peripheral regions). Luminaires can then, for example, be categorized based on their locations relative to the user's predominant field of vision. In this context, a luminaire's location relative to the determined field of view means its angular separation (in one or two dimensions) from the determined predominant line of sight LOS. For example, they may be categorized based on whether or not they are within the user's predominant field of view, or using more in-depth categorization e.g. luminaires within the predominant field of view may be categorized as macular and peripheral in one or the simplest cases, or based on additional levels of granularity (based on one or more sub regions of the macular and/or peripheral regions). For example, FIG. 8 shows two luminaires 204, 208 that are identified as being in the peripheral vision region of the user's predominant field of view, and a third luminaire 206 in the user's macular vision region. As a simple example, the intensity of the light emitted luminaire 206 identifies as being in the user's macular vision region may be dimmed as a result, or its color temperature may be reduced to increase the user's comfort—on the basis that the light from luminaires in the user's macular vision is likely to be more distracting or uncomfortable than light from luminaires in his peripheral vision.

As noted above, the predominant line of sight of the user may be determined by processing the panoramic image so as to identify a center or edge; identifying an object that can be assumed to be at the center, such as a TV; or by requesting the user to manually indicate the center of the panoramic image, via the user interface displayed at the user's device.

Once the predominant line of sight of the user is known, the predominant field of view of the user can be determined. For example, the predominant line of sight determined for the user can be used to define the central point (i.e. zero degrees) within the user's field of vision. It may be known that human vision corresponds to a field of view that covers e.g. an angular range of +110° and −110°, about the center point. Thus, the field of view of the user can be determined, by determining the corresponding area of the panoramic image that falls within this angular range.

At step 708 the location of the luminaires relative to the predominant field of view of the user is determined. This may involve identifying the locations of the luminaires in the area of the panoramic image that corresponds to the user's field of view and determining the angular ranges that these correspond to. For example, the field of view of the user may be separated into angular ranges, e.g. central gaze region, paracentral, macular, near peripheral, mid peripheral, far peripheral (see FIG. 8) and the panoramic image may be processed so as to determine which of the angular ranges the luminaires are located in (or are closest to).

At step 710, the luminaires identified in the panoramic image are controlled, based on their locations relative to the user's predominant field of view. For example, these luminaires may be treated as belonging to a group, and may therefore be controlled in a way that is distinct from the other luminaires in the physical space. Example use-cases of the above-described method are provided below.

Mapping Lighting System in an Open Plan Office

Many office workers have their desks within an open plan office environment. For people in office zone X, a specific troffer luminaire may be in their peripheral vision or behind them. For people in office zone Y, the same luminaire may be in the direct field of view of the user (i.e. within the center gaze region of the user, when the user is sat at his/her desk in office zone Y). Hence, while the luminaire contributes light to both office zones, it would be desirable to optimize the lighting control behavior of this luminaire, with regard to the light experienced by a user in office zone Y.

An open plan office may comprise multiple sub-spaces, where each subspace is defined by office furniture such as filing cabinets, plants or cubicle dividers. In such an office environment, it is desirable that luminaires within the same subspace show a visually coordinated light effect. For example, if a user is detected as being present in one of the sub-spaces (e.g. detected by one of the luminaires), it may be desirable to switch on all of the luminaires in that subspace—i.e. the luminaires may be identified as belonging to a particular motion group (see Philips U.S. Pat. No. 7,242,152). It is assumed that the lighting control system has already been set up by commissioned experts previously, but that after the moving of desks and cabinets there is a need to re-adjust again (fine-tune within the boundaries) the system behavior to the new situation.

Figure 11A:
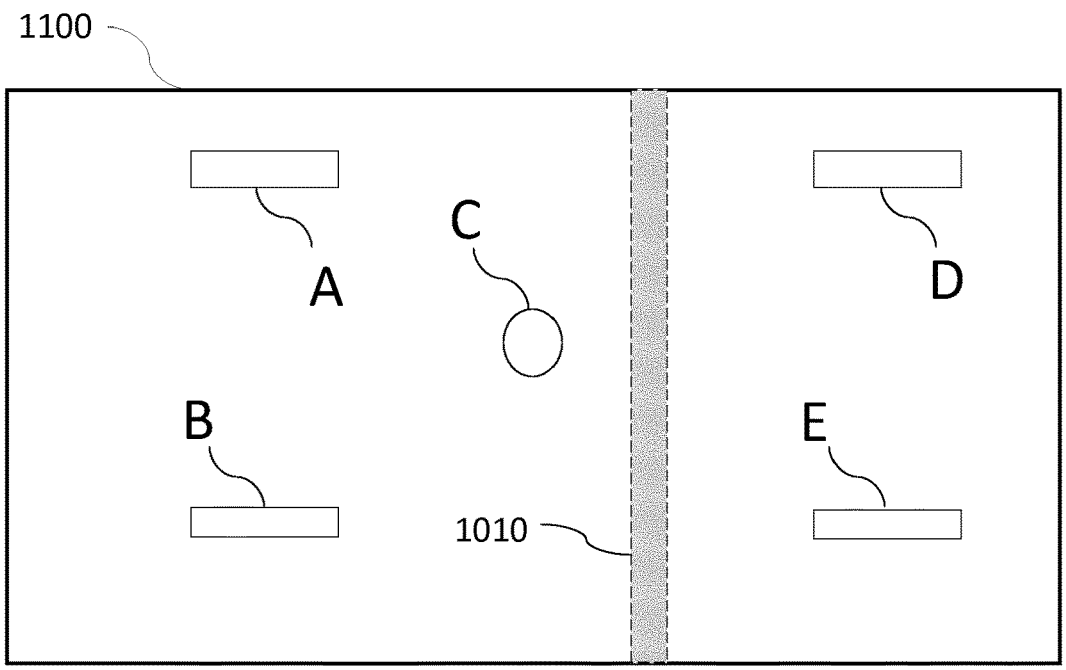
FIGS. 11a and 11b illustrate the separation of a physical space into different sub-spaces, at which different luminaires are located.
Figure 11B:
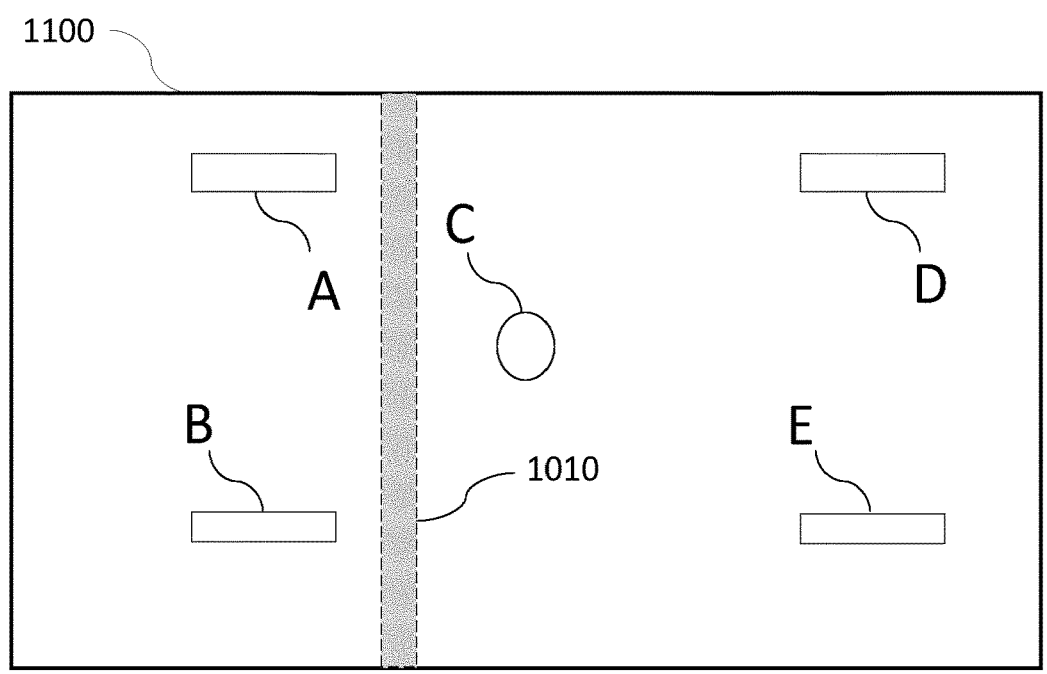

For example, in flexible office spaces, the arrangement of the office furniture may be frequently re-arranged (or new pieces are added/removed) while the lighting system in the ceiling remains unchanged both physically and controls logic wise. When the lighting system was initially installed, luminaires A, B and C may have been within the same open-plan office subspace, while luminaires D and E were in the adjacent sub-space within the same open plan office space. However, upon shifting of the filing cabinets, luminaire C may now belong to the adjacent sub-space (i.e. provide a dominant contribution of illumination to that sub-space). This is illustrated in FIGS. 11a and 11b, where, as a result of the movement of partition 1010, luminaire C is moved from a first sub-space to a second-sub space, within the office 1100.

The present disclosure enables a non-expert, such as a facility manager or end-user, to adjust grouping of luminaires, based on the capture of a panoramic image. As noted earlier, the panoramic image enables the predominant line of sight (and corresponding field of view) to be determined, and therefore the luminaires that fall within that field of view to be identified. Thus, the user does not need to manually select the luminaires that belong to a particular group each time the office furniture is rearranged. Furthermore, the user does not need to rely on pre-programmed lighting profiles that do not take into account the position of the user in the physical space.

An embodiment in which two or more luminaires may be identified as belonging to a particular motion group is described below.

As a user scans during the panoramic shot from left to right, first ceiling luminaire A is switched on and then as the user rotates the camera to the right, it is turned off and ceiling luminaire B-E are switched on respectively (i.e. in sequence). This has been described previously in reference to FIG. 5. An estimation can be made for overlapping areas of light effects, which luminaires are not visible (e.g. hidden behind a cabinet) and hence do not account for glare and which luminaires in the ceiling are predominantly part of the logical subspace of the viewpoint from which the office worker is experiencing the lighting effect. Based on this, those luminaires are configured to form a single motion group, i.e. all the luminaires react to an occupancy sensing event on one of the luminaires within the group in concert. That is, if one luminaire senses motion, all of the luminaires are switched on.

In alternative embodiments, a user may be asked to capture a panoramic image by first taking an image of his/her primary viewing direction and then panning to the left until the end of his/her viewing direction is reached. After that, the user may be asked to pan the camera device to the right, until the end of his/her viewing direction is reached, and then to pan back to the center. This means that the center of the image can always be identified as his/her primary viewing direction—i.e. his/her predominant line of sight. Capturing the panoramic image in this way also means that for each region of the physical space, two sub-images can be captured. Hence, it is possible to capture the same region of physical space, under different light settings, as the user performs 'one' sequential movement of the camera device. As described earlier, capturing the same region of physical space under different lighting settings can be used to determine the contribution of illumination from each of the luminaires that illuminate that region of the physical space.

The grouping of luminaires into motion groups may be applicable to e.g. garden lighting in residential applications. For example, the group of luminaires that are determined as being in a user's field of view may be identified as illuminating a particular sub-space of the garden, and may be switched on or off, whenever movement of a user is detected by one of the luminaires in that sub-space.

Alternatively, the panoramic images may be used to decide which lighting control behavior profile to activate in a luminaire. State-of-the-art lighting control systems such as Philips SpaceWise feature pre-packaged out-of-the-box application solutions, while also providing the technical flexibility to tune the room light levels and controls behavior in the field for a user's desired conditions. Depending on the mounting location of the luminaire, one of the pre-defined application modes for open plan offices, private offices, meeting rooms, corridors and emergency egress is activated (the system uses distributed intelligence, where the luminaire rather than a central controller decides on the light-level of the luminaire).

The panoramic imaging process described in this invention can be applied to decide in the field whether a luminaire is in the field of view of an open-pan office desk worker, a private office or a corridor. Whenever the office furniture is re-arranged, the lighting profile can be easily updated by the panoramic mapping process.

In an office context in particular, it can be useful to allow users to adjust the light level of relevant luminaires to the task; for instance, low lux lighting for screen work, high lux lighting for paper work. Panoramic shots can take place from multiple locations where different office workers are enjoying the light effect, and the system may take into account that one user wants to do paper work while another user in the same open plan office space is busy with CAD drawings on the computer. For instance, a total of four people make take an image from their respective work area to represent what they see from their work location (at eye height to have 120 C representation field of view user and surroundings; optionally, the direction where user is facing is used as a focus point for the optimization) and subsequently the system provides arbitration. The arbitration may be skewed that the most talented employees or the employees currently performing the most difficult task are provided with better light.

Another context in which the above-described method may be implemented is in a warehouse, where the warehouse isles are reconfigured, due to movement/addition/removal of shelving units. A user, such as a forklift driver, may capture a panoramic image from their point of view within their driving path (whilst remaining stationary) and the luminaires determined as being in the user's field of view may be identified as a forming a single motion group. In this context, the camera device may be conveniently mounted on the forklift for convenience and safety.

Figure 9:
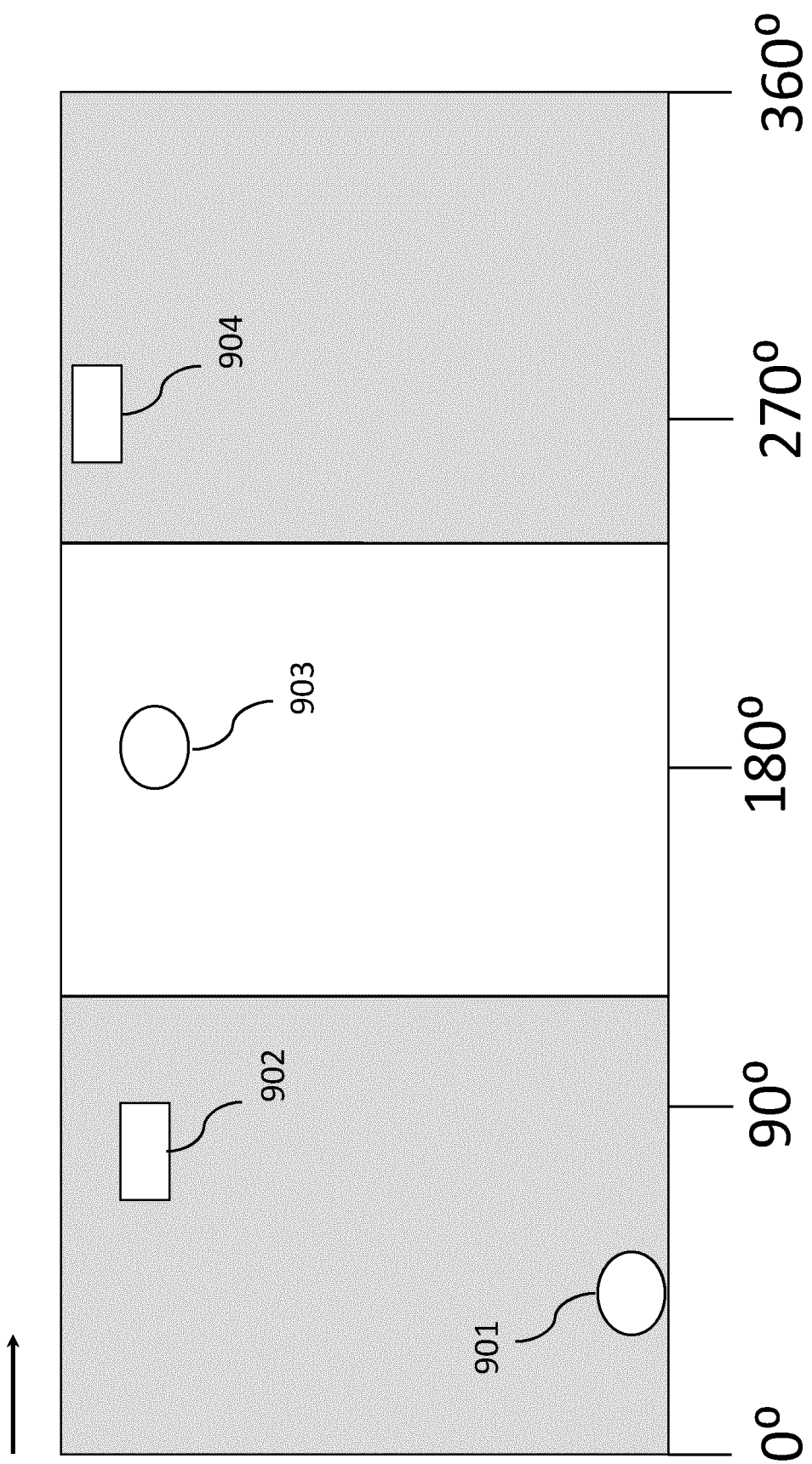
FIG. 9 shows a schematic representation of a 360 degree image of a physical space and the regions of the panoramic image that are determined to be in a user's field of view.

Note, that whilst in the embodiments described above the method has been described in relation to a user capturing a plurality of images, as part of a panoramic image. In alternative embodiments, the user may capture a single image, or load a single image (that is not necessarily panoramic) into the application, and the location of the luminaires relative to the user's field of view may be determined based e.g. on known image processing techniques. FIG. 9 shows a schematic representation of a 360 degree image of a physical space and the regions of the panoramic image that are determined to be in a user's field of view.

Since a 360 degree panoramic image has been captured, and the field of view of a human is known to be less than this (e.g. covering a range of 100-110° either side of the predominant line of sight—as shown in FIG. 8), the panoramic image will inevitably capture a volume of physical space that does not fall within the user's predominant field of view. For example, referring again back to FIG. 8, if the user's initial position corresponds to their predominant line of sight, as the user rotates their camera outside of the far peripheral angular range (past 100-110°), the corresponding volume of space captured by the camera device will be outside of the user's predominant field of view, until the camera device is rotated through the next 140-160°, back to the next far peripheral angular range. That is, a region of the physical space captured in the panoramic image will be behind the user, relative to his/her predominant facing position (and thus be out of sight to the user, when the user is in his/her predominant facing position).

In the example shown in FIG. 9, the regions of the physical space that are determined to be in the user's field of view are represented as shaded regions. As in FIG. 8, these regions correspond to approximately 100-110° to the left and right of the user's predominant line of sight. The lighting control application may determine that luminaires 901, 902 and 904 are within the user's predominant field of view, while luminaire 903 is not. As a result, the application may ensure that luminaire 903 does not contribute to, or provides a minimum contribution to, the illumination of the physical space that is within the user's predominant field of view.

Figure 10:
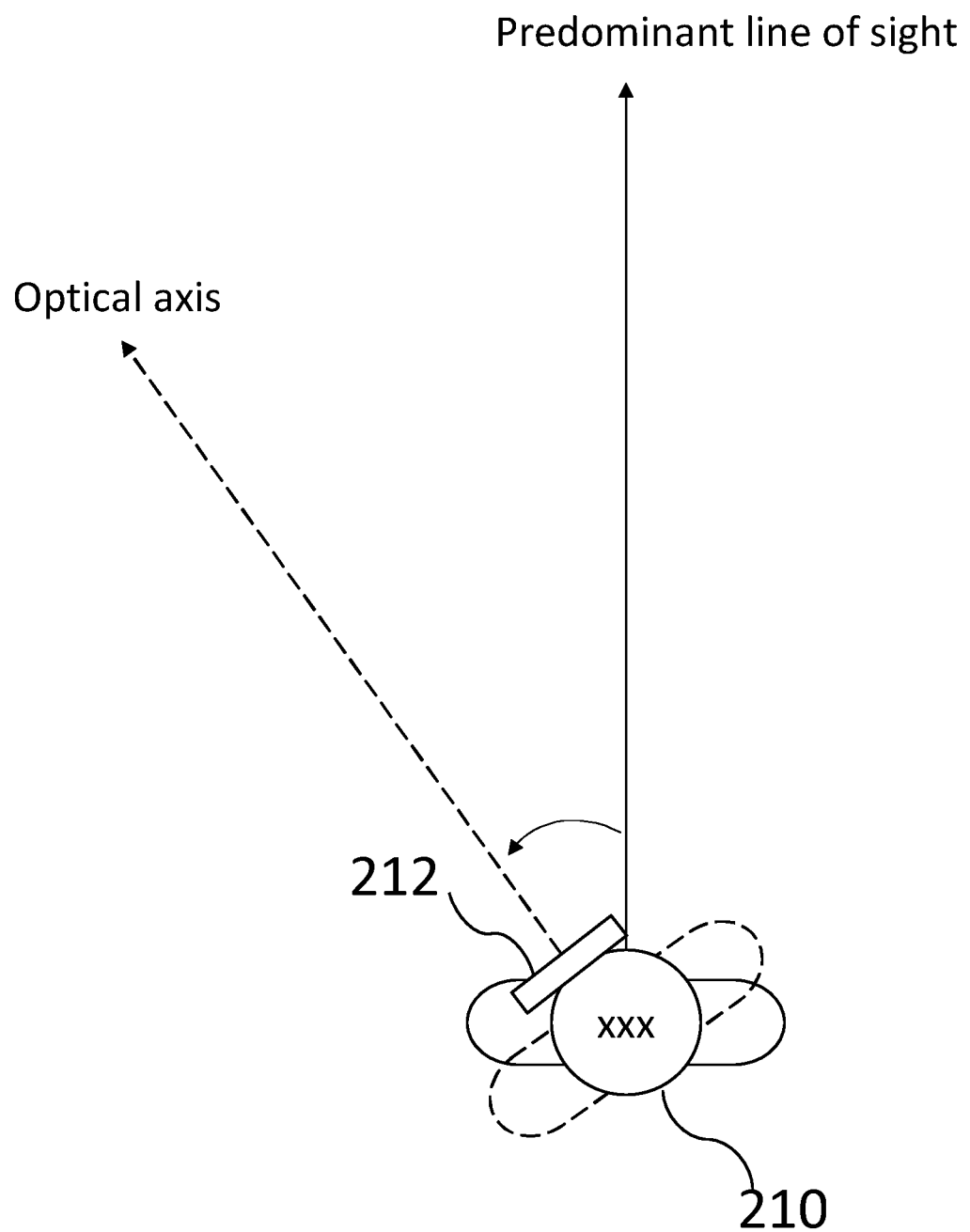
FIG. 10 illustrates the rotation of an optical axis of the camera device, relative to a user's predominant line of sight.

FIG. 10 illustrates the rotation of an optical axis of the camera device, relative to a user's predominant line of sight.

In the example of FIG. 10, a user is stationary and facing a direction that corresponds to his/her predominant line of sight. This is indicated by the user 210 in bold, facing the direction indicated by the predominant line of sight. As the user points the camera in this direction (not shown), the optical axis of the camera device 212 lies substantially parallel to the predominant line of sight of the user. As the user captures a panoramic image and rotates their camera, the optical axis of the camera device is rotated away from the user's predominant line of sight. In the example of FIG. 10, the user has rotated their camera to the left, and as a result the optical axis no longer lies parallel to the predominant line of sight of the user. The optical axis of the camera device may lie substantially parallel to the line of sight of the user if the user rotates the camera device back towards the predominant line of sight (e.g. by capturing a 360° image, or by rotating their camera device through the same angle, in the opposite direction).

An additional use case of the above techniques allows a lighting scene to be rendered based on a selected scene image.

It is known in the art to control luminaires of a lighting system to render a version of an image selected by a user (a "scene image"), by selecting dominant colors in the scene image and controlling the luminaires to render matching colors. For example, the Phillips Hue application incorporates this functionality.

In current lighting applications, when a user selects e.g. an image of a sunset over an ocean as the basis for his/her lighting scene, this image may be represented by the colors blue (from the sea), orange and yellow (from the sun). However, currently these colors are randomly applied to luminaires in a room, thus it may be that blue is shown by luminaires directed towards the ceiling and yellow is scattered across multiple luminaires. Accordingly, whilst existing systems are able to provide a faithful reproduction of the scene image colors by the lighting system, they cannot guarantee a faithful reproduction of their locations.

Another use-case of the above described techniques provides a solution to this problem, by allowing two or more colors within such a scene image to be rendered by the luminaires in the physical space, such that the locations of the colors in the image are mapped to corresponding "luminaire locations" in the physical space. This allows the luminaires to render a more accurate version of the scene image as both not only the colors in the scene image, but also the locations, are recreated in the version rendered by the lighting system. Note that the term "luminaire location" in this context means generally a location associated with a luminaire. This can be the location of the luminaire itself, but can also be the location of a lighting effect created by that luminaire on a surface of the physical space (for example, a "luminaire location" of a floor lamp can be the location of an illumination footprint on the ceiling that is projected upwards by the floor lamp).

The directionality of each luminaire (i.e. the direction in which the illumination fingerprint of the luminaire is predominantly cast) may be determined from the captured images. In addition, knowledge of the position and size of the windows (including North-South orientation) may also be determined; that is, the system may account for sources of natural light that can contribute to the illumination of the physical space. When this information is known to the lighting system, a lighting atmosphere that matches better with the visual representation of the scene can be created (and rendered) automatically.

Controlling luminaires to render a version of a scene image is equivalent referred to as controlling the luminaires to render a "scene" based on the scene image. With the rendered scene, each luminaire has a "role" that it is rendering one or more colors in the scene image.

The below-described embodiments describe how panoramic images (or more generally, images) can be used to capture the position and directionality of natural and artificial illumination sources, in order to give a more accurate and perceptually similar representation of an image, such as the "sunset over the ocean". In preferred embodiments, an application running at the user device determines, based on a panoramic image, which roles in a lighting scene a luminaire is best suited to; this is determined for each one of the multiple luminaires in the room.

Figure 12:
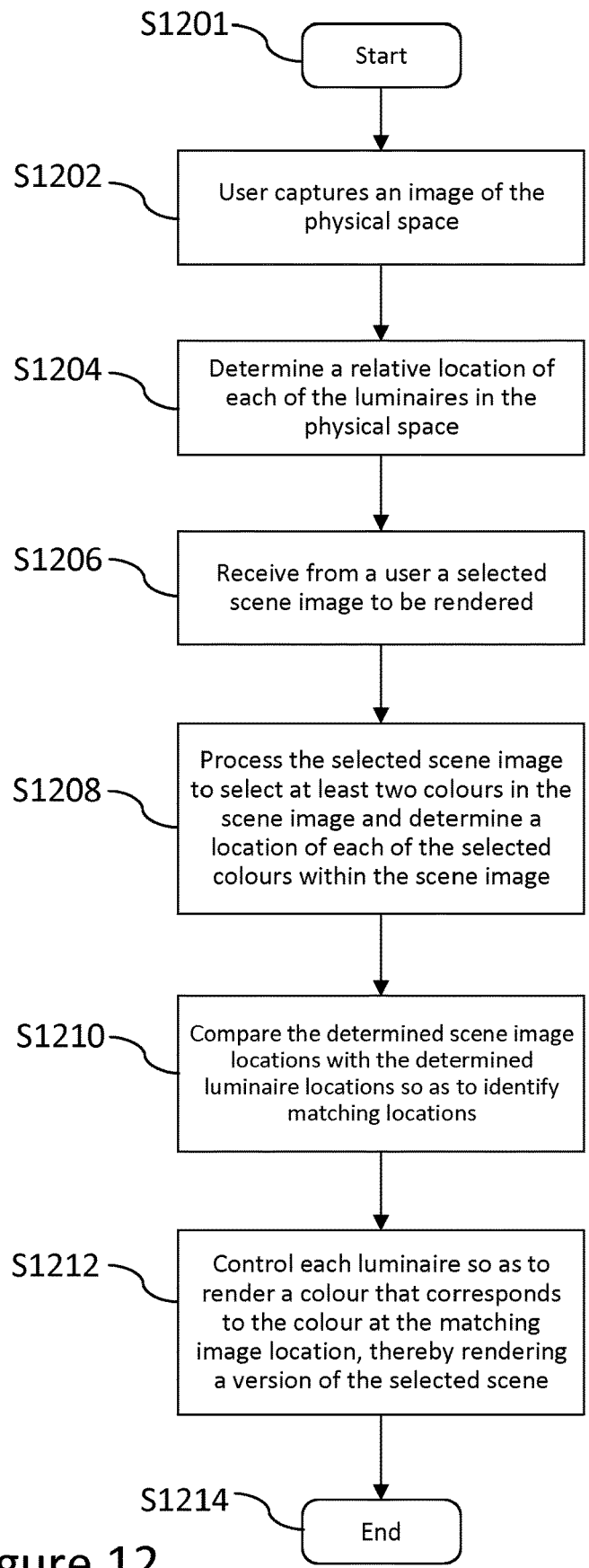
FIG. 12 illustrates a series of method steps for controlling a plurality of luminaires based on their locations in a physical space and the locations of two or more colors in an image.

FIG. 12 illustrates a series of method steps for controlling a plurality of luminaires based on their locations in a physical space and the locations of two or more colors in an image.

The process starts at step S1201.

At step S1202 a user captures an image of the physical space. For example, the user may capture panoramic image, as described earlier (e.g. at step S502a, FIG. 5). In some embodiments, a user may capture multiple panoramic images.

At step 1204, the relative location of each of the luminaires and/or one or more of their illumination footprints in the physical space is determined—e.g. based on their locations in the image. This step may be performed as described previously (as in step S504 in FIG. 5).

At step S1206, a user selects a scene image to be rendered by the luminaires. For example, the user may have an image pre-loaded onto their device, such as an image of a sunset, and the user may select this image by importing it into the lighting control application. The selected image may be obtained by the user in a plurality of different ways, for example, the image may be downloaded from the internet, may have been captured by the user at an earlier time on their user device or via another camera device, or may have been selected from a set of stock images that are included as part of the lighting control application.

At step S1208, the selected scene image is processed so as to select at least two colors in the scene image for rendering by the luminaires. For example, the application at the user device may execute an image processing algorithm (or cause such an algorithm to be executed) which extracts a set of colors from the selected image. The image processing algorithm may select the at least two colors by determining a color palette of the image (i.e. converting the image to a palette of colors), where the color palette is a set of color identifiers/vectors corresponding to colors occurring in the scene image.

For example, if the user selected an image of a sunset over an ocean, the image processing algorithm may extract the colors blue, purple (from the sea), orange and yellow (from the sun). The colors may be extracted automatically by the image processing algorithm, for example, depending on the prevalence (i.e. frequency) of different colors within the image (e.g. based on the prevalence of RGB/YUV values within a particular set of ranges) and the ability of the luminaires to render those colors. The set of colors which can be rendered well is referred to in the art as the "gamut" of the lighting system and the gamut of the lighting system may be taken into account when selecting the colors. Colors that can be rendered well by the luminaires may be selected with greater preference than those that cannot. Furthermore, the number of colors that are selected may be determined based on predetermined knowledge of the number of luminaires in the physical space (which may be known, e.g. at the control unit 216 and notified to the user device). For example, the number of colors selected may be the same as the number of luminaires that are known to be in the physical space, or within the user's field of view.

Alternatively, the user may manually select each color, using e.g. a color picker that shows each color, or an average color, as a user selects, or hovers over a region of the scene image. However, in preferred embodiments, the colors are selected by image processing algorithm automatically, based e.g. on their prevalence and the ability of the luminaires to render those colors.

Respective locations of the at least two selected colors within the scene image are determined (herein referred to as the determined scene image locations). The application may determine where within the selected image the colors are most commonly found. For example, for each color identified in the color palette, the scene image location for that location may be determined by identifying a region of the scene image in which that color is dominant.

For the sunset image described above, the application may determine that yellow and orange are mainly found in the center of the image and blue and purple are mainly found at the top and bottom of the image. The locations of the colors within the image may be identified using e.g. a blob detection algorithm—which is well known in the art. Here, identifying the location of a color may refer to identifying a region in the image that is dominated, on average, by that color (the 'average color' corresponding to a group of color vectors that are similar to the selected color).

At step S1210, the determined scene image locations (i.e. locations of the selected colors within the image) are compared with the relative locations of the luminaires and/or their illumination footprints within the physical space, such that for each of the determined scene image locations, a matching one of the luminaires is identified.

This may include, for example, determining the contribution of illumination from each of the luminaires so as to determine where, within the physical space (or rather, the extent of physical space that is captured in an image at step S1202), each of the luminaires cast their illumination (i.e. in the form of an illumination fingerprint). Using this information, each of the determined scene image locations can be mapped to a corresponding luminaire based not only on the location of the luminaire, but also the region(s) of physical space that are illuminated by that luminaire from the user's perspective. Thus, the determined image locations are mapped to corresponding regions of the physical space. This step may also comprise compensate for differences along the Z-axis (i.e. depth). Lights that are closer may emit colors at lower brightness, lights further away may emit more light to compensate for the differences.

At step S1212, each of the luminaires are controlled so as to render a color that corresponds to the color at the matching scene image location. For the sunset image example described above, this would mean that luminaires that are predominantly at the top or bottom of the physical space (or cast their illumination in those directions) may be controlled so as to render a blue or purple color. Luminaire (s) that are predominantly in the center both horizontally and vertically (or cast their illumination to this region of the physical space), may be controlled so as to render a yellow or orange color. It is beneficial to correctly map the colors from the scene image to the luminaires, based on the position of the luminaires relative to the user, and the knowledge of where, within the physical space, each luminaire casts its illumination. For example, a luminaire on the floor may still have a majority of its light effect (illumination footprint) directed towards the ceiling.

As noted, the location does not necessarily mean an individual pixel or even (x, y) location in the image—it can for example refer to a region of the image where a narrow range of colors is dominant. References to a luminaire rendering a color in a scene image does not necessarily mean an exactly matching color—e.g. the image color may be transformed slightly to bring it into the gamut of the luminaire.

It should also be noted that, information other than the determined scene image locations may be used to control the light output by each of the luminaires. For example, the luminaires may be controlled so as to take into account the time of day, and contributions of illumination from sources other than the luminaires. Contributions of illumination from sources other than the luminaires may be determined based on processing of the image captured at step S1202. This is described in more detail, later.

Figure 13B:
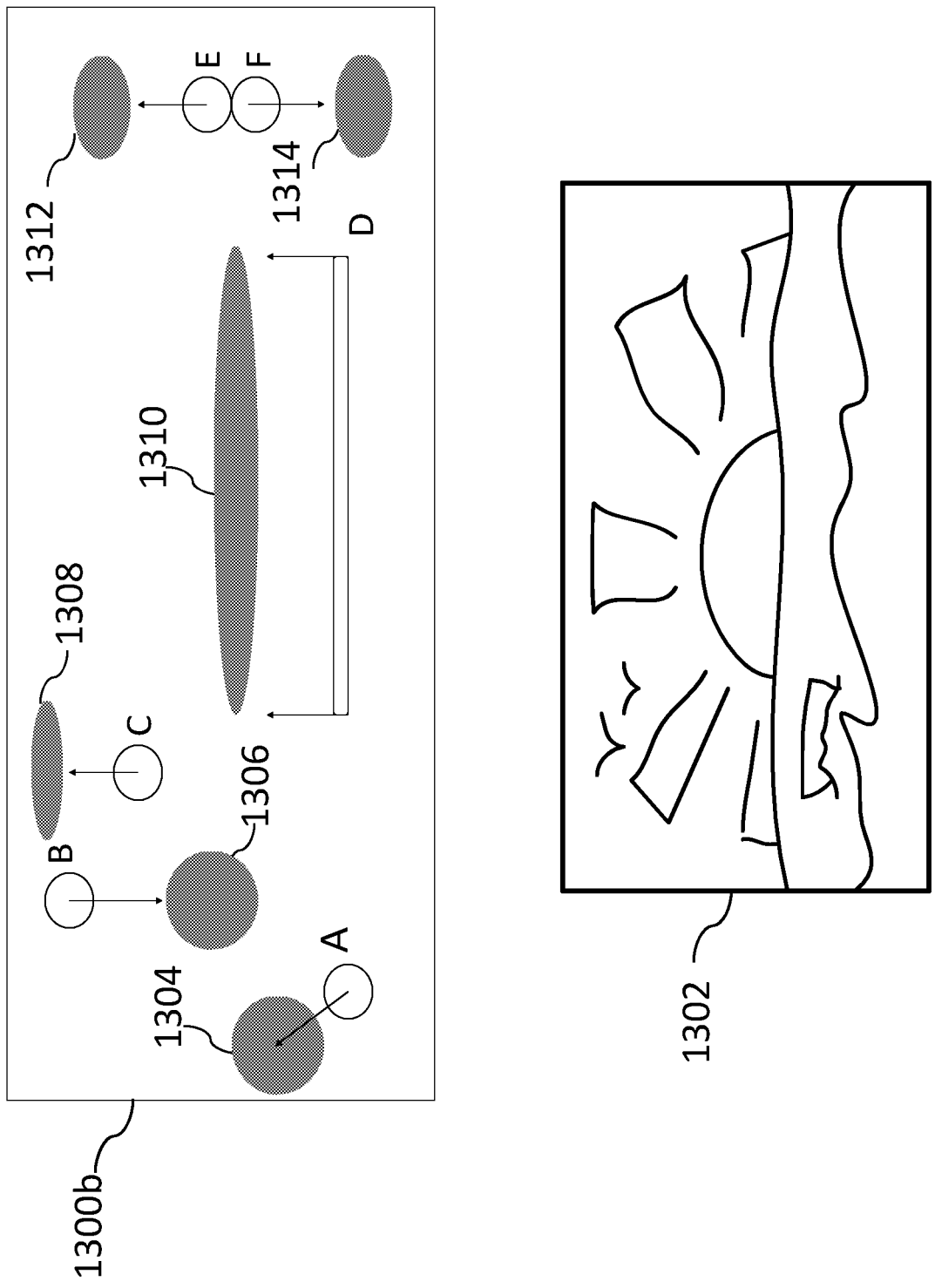
FIG. 13b illustrates a schematic representation of a scene image (1302) and a panoramic image (1300) of a physical space in which luminaires A-F are visible to a user, and provide respective contributions of illumination.

FIGS. 13a and 13b illustrate a schematic representation of a scene image (1302) and a panoramic image (1300) of a physical space in which luminaires A-F are visible to a user. The directionality of the light output by each of the luminaires is indicated by the arrows shown in the figure. The shaded regions shown in FIG. 13b show a 2D representation of the contribution of illumination from each of the luminaires.

The image captured at step S1202 (FIG. 12) may be processed so as to determine at least one of the five following features:

The position of each light source

The directionality of each light source

The spatial contribution towards the light effect in the physical space for each light source (e.g. the areas/volumes of the physical space illuminated by each of the luminaires—i.e. the contribution)

The relative contribution towards the light effect from the perspective of the user (taking into account e.g. the intensity profiles of the luminaires and the distance between the user and the luminaires)

The position and size of any windows in the physical space (including North-South orientation)

Using this information it is possible to inform the system about the individual contribution from each of the luminaires towards the lighting scene, from the point view of the user.

An example embodiment in which the above-described method may be used is in a residential living room.

For example, based on the mapping between the selected colors in the scene image and the locations of the luminaires in the physical space, an optimal role for a specific lighting scene may be assigned to each luminaire. For instance, in a scene "sunset over the ocean", as shown in scene image 1302, a lamp representing the blue ocean should be located physically close to the floor, while a lamp representing the sun should located higher, but centrally in the room.

The information regarding the position of the luminaires can be determined via the panoramic image. As the user captures a panoramic image from his/her viewpoint, information about lights in the image can either be captured automatically (e.g. via coded light or precision indoor locating techniques using e.g. beacons) or can be later added by the user, by indicating the position of the luminaires in the panoramic image. In one embodiment, precision localization may involve the use of well-known Ultra-wideband technology (such as that used by the SevenHugs remote control). The position of the luminaires can be determined in any of the ways described previously, in reference to FIGS. 5 and 7.

Based on the captured panoramic image and the positions of each of the luminaires, the system (or, in preferred embodiments, the application) may generate a lighting atmosphere image from the panoramic image. This image is shown as image 1300*b* in FIG. 13*b*. The lighting atmosphere image shows the contribution of illumination from each of the luminaires (shaded) in 2D space. As can be seen in image 1300*b*, luminaires A, B, C, D, E and F each cast respective illumination fingerprints 1304, 1306, 1308, 1310, 1312 and 1314.

As can be seen in FIG. 13*b*, the system has determined that lamps A, B and F have their main effect (i.e. dominant contribution) at the bottom of user's viewpoint of the physical space. As a result, these luminaires are selected so as to render colors that correspond to the colors of the sea in scene image 1302. Lamps C and D are determined as having their main effect at the center of the user's viewpoint, and consequently, are selected to represent the sun. Lamp E—though physically located to F, is determined to have its effect at a higher location in the physical space and is thus selected to render the orange color at the edge of the scene image 1302.

In some embodiments, the mapping between scene image locations and luminaire locations may be based on how each luminaire contributes to a lighting effect based upon the user's field of view and point of view.

Here, the user's point of view of a luminaire depends on the distance between the user and that luminaire. For example, a stationary user located at the center of the room may have a field of view, F, covering an angular range, e.g. 100-110 degrees either side of their predominant line of sight (see FIG. 8). From this point within the physical space, the light emitted by a given luminaire (located within the user's field of view) may be detected with an intensity, $I_1$. If the user moves forwards within the physical space, but remains such that his/her predominant line of sight is in the same direction, the user's field of view will still be 100-110 degrees either side of their predominant line of sight (i.e. F), but their point of view will have changed. If the user has e.g. moved towards a luminaire, the light emitted by that luminaire may be detected with a higher intensity, $I_2$ (since the light has not been distributed over such a large surface area, at that position). Thus, it is useful to determine the contribution from each of the luminaires that are within the user's field of view, based on the user's point of view.

For example, a consumer lighting system may comprise multiple lighting devices (luminaires) capable of emitting light at different colors and/or different intensities. A first lamp, lamp A, may be closer to the user than a second lamp, lamp B. Both of the lamps may be within the user's field of view. Lamp A may be rated at 100 lumen and lamp B may be rated at 500 lumen. To create a sunset scene, two colors may be rendered: orange for the bright sun, and blue for the water behind which the sun sets. Based on the lumen outputs of each luminaire, the system might select lamp B to render the sun, since it has a higher lumen output. However, in doing so, the point of view of the user (and thus intensity of the light, as experienced by the user) is not taken into account, thus resulting in a sub-optimal lighting scene.

When a user captures a panoramic image from his/her point of view, the contribution of illumination from each of the luminaires, as seen from the user's point of view, can be determined. For example, the fact that lamp A is very close to the user means that it actually appears brighter than lamp B. A ratio between the detected intensities can be determined; for example, for lamp A this may be e.g. 7x and for lamp B this may be 0.8x, where x may be a common unit of intensity. When taking this ratio into account, lamp A would the logical choice for rendering the sun in the scene since it is the lamp that appears brightest to the user.

The same method can be applied to luminaires that provide contributions of indirect light/color. For example, if lamp A is next to a black wall then there will be little indirect light. If lamp B is next to a green wall, then only for the color green will it provide indirect light. The amount of indirect light/color captured in the panoramic image can be used to determine how bright each of the luminaires appear to the user (and/or how much of the physical space is illuminated by them), and thus used to inform the selection of luminaires for rendering colors selected from the scene image.

It should be noted that, in order to determine that one luminaire is further from the user than another, the intensity of light output by each luminaire at the source (e.g. the lumen level) should be known.

For example, each of the luminaires that appear in the panoramic image may be identified as being of a respective type, for which the lumen level is known. The luminaires may be identified as being of a particular type based on e.g. information received from the luminaires themselves (coded light, localization devices etc.) or based on information input by the user.

The panoramic image (or one or more individual images captured as part of the panoramic image) may be processed so as to compare the intensity of the light detected from a particular luminaire with the intensity of light that is known to be emitted by the luminaire, at the source. A relationship between the distance from the luminaire and the intensity of lighted detected from that luminaire may be known (or estimated), and used to infer the distance between the luminaire and the user. The relationship between the distance from a luminaire and the intensity of light detected from that luminaire, may be the same for all luminaires, or may be specific to each type of luminaire. This relationship may be used to determine the ratio for each of the luminaires (as described previously for lamps A and B), and therefore to determine which of the luminaires is located closest to the user. This may be performed at the user device, i.e. by the application, and/or by a separate device, such as the bridge.

An example use-case, in which the user's point of view is considered in rendering a lighting scene, is described below.

A user in a residential setting (i.e. at home) may be performing yoga exercises and may wish to render a lighting scene, using the luminaires that are in her field of view. When the user is lying on her yoga mat, her eye height (level) may be very low; hence a desk luminaire may only be suited to representing the sun high up in the sky, while a portable Hue Go luminaire placed on the floor may be best suited for representing the sun set. However, if the same consumer, after the workout is enjoying a drink sitting on a high bar chair in the same room, the desk luminaire may become the luminaire most suited for fulfilling a sunset function in a relax scene. Consequently, while one luminaire embodies the setting sun in the Yoga Sunset scene, another luminaire will be used to represent the sun in the Relax at the Bar Sunset scene. This can, for example, be adhered by the user capturing two panoramic images at different eye levels, or by tracking the user's level.

The lighting control application may also take into account the time of day, when rendering a lighting scene.

For example, from the view point of a user sitting on a sofa, a window may be behind a desk luminaire. Hence, rendering for instance, ambient light effects on this desk luminaire may have little visual impact during the day, compared to the visual effect of the same ambient light effects rendered during the night.

The time of day may also be accounted for when determining the intensity setting of each luminaire (i.e. the intensity of light that they should output). For example, a luminaire may be controlled so as to emit light at a different intensity at night, compared with e.g. noon; e.g. depending on the circumstances a higher intensity at night if more light is needed for illumination, or a lower intensity at night (it may be that less light is needed for the luminaire to stand out at night, e.g. if it is competing with daylight during the day).

In some embodiments, the image (e.g. panoramic) captured at step S1202 may be processed so as to determine at least one illumination characteristic of an uncontrollable source of illumination in the physical space that is not part of the lighting system. Here, the term 'uncontrollable source of illumination' refers to a source of illumination for which the intensity or color of light output by that source cannot be controlled via the lighting control application. For example, a natural illumination source, such as the sun, may be considered an uncontrollable source of illumination.

The image captured at step S1202 may be processed so as to determine whether a source of illumination is from e.g. a window, through which e.g. sunlight, is shining. This source of illumination (an 'uncontrollable source'), may be identified based on one or more illumination characteristics, such as, for example, spectral lines associated with the illumination fingerprint cast by that illumination source. The lighting control application may be pre-configured with one or more pre-determined illumination characteristics for one or more known illumination sources, such as e.g. the sun, moon, a sodium street lamp etc. and the application may compare these with the one or more illumination characteristics determined for each of the luminaires that appear in the panoramic image. The lighting control application may control the luminaires such that, for a selected scene image, the contributions of illumination from any uncontrollable illumination sources are accounted for, when rendering the lighting scene in the physical space. In some embodiments, the determined contribution of illumination from a given luminaire may be used to determine one or more illumination characteristics of that luminaire.

In more complex embodiments, the application may be capable of identifying any windows that appear in the image, based e.g. on the size, shape and intensity of light detected in a particular region of the image. The application may also be capable of determining the direction that these windows face, for example, based on the orientation of the camera device, when the image of the window is captured. Using this information, the application may be configured to predict the intensity of light from e.g. the sun that will shine through that window, as the day passes. This, in turn, may be taken into account when controlling the luminaires so as to render the scene image.

In some embodiments, an image may be captured of a natural illumination source in an unobstructed state—e.g. a window illuminated by sunlight, where any blinds or curtains are open. The image may be processed so as to determine at least one daytime illumination characteristic of the natural illumination source, such as the intensity of light. The user may then be asked to capture another image of the natural illumination source in unobstructed state, and the image may be processed so as to determine at least one night-time illumination characteristic thereof. For example, the user may be asked to capture another image of the same region of physical space (e.g. the window), at night. The lighting control application may be configured to determine the time of day at which a lighting scene is to be rendered (the lighting scene corresponding to a selected scene image), and may control the luminaires such that the version of the lighting scene that is rendered accounts for the current time of day using the determined day time and/or night-time illumination characteristic of the natural illumination source. For example, if a user selects a scene image for rendering via the luminaires in the evening, both the day-time and the night-time illumination characteristic of the illumination source may be taken into account, when rendering the lighting scene (in this example, an 'evening-time' illumination characteristic may be estimated, based on the day-time and night-time illumination characteristics).

The above-described embodiments enable a user to leverage panoramic mapping to determine the suitability of lamps or sensors to represent certain roles in a lighting scene. The role can be related to the position of the light source, but may also be dependent on the time of day, such as a decorative lamp with a south-facing window in the background (from the user's point of view). The above-described embodiments may be applied both consumer and professional lighting systems.

In various embodiments, one or more of the various enhancements set out below can be implemented.

The user may be asked to take additional panoramic images under different artificial and natural light conditions. For example, first, the user may be asked to switch off all conventional non-connected light sources; then the control unit may wirelessly switch off the luminaire(s) and the user may be asked to record a first panoramic image. Subsequently, the user may be asked to capture a second panoramic image when all of the luminaires are switched on (alternatively, the luminaires may be switched on, or dimmed up on a one-by-one basis). By subtracting the luminance values of the panoramic images the system can automatically estimate where the light sources are physically located and their light distribution in the target area (e.g. table).

For the case of a color changing lighting system, the user may take a panoramic image with the luminaires set at different (dynamic) color temperature/color spectrum conditions.

Alternatively or in addition, panoramic images may be taken at different times of the day when the light-effect is to be enjoyed by the user.

Alternatively or in addition, the user may be asked to capture a first panoramic image during the night to eliminate natural light; when comparing with a second panoramic captured during the day, the daylight contributions to the room's lighting can be identified.

Alternatively or in addition, the user may be asked to capture a first panoramic image with opened (i.e. uncovered) window blinds and subsequently take a photo with the window blinds closed. The system can then determine the window location and the daylight contributions.

Alternatively or in addition, the user may indicate on the picture, the physical room structure (or more generally, physical structure of the physical space) and the dimensions of the environment.

Alternatively or in addition, the user may be asked to switch the conventional light-sources in the room on one-at-a-time and indicate on the picture the corresponding wall switch.

Alternatively or in addition, the user may be asked to indicate on the panoramic image for each luminaire in the room the location of the corresponding wall-switch; the app then determines which luminaires share the same switch-leg wiring and wall-box location. The wiring scheme is important for upgrading the home automation systems with mains-voltage wireless wall switches with relays and/or mains voltage wall-switches with integrated electricity sub-meters for power consumption monitoring. In some embodiments, if a luminaire is in direct plain view then, based on the received lux level by the camera under different emitted lumen levels, the system may be able to estimate (relative) distances in the room.

To ensure that the user keeps the same viewpoint when taking multiple panoramic a previous panoramic image may be displayed as a background when capturing a new image. As noted, as an alternative to panoramic images, video (i.e. moving images) may be captured instead. Thus, all references to panoramic images pertain equally to moving images.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a plurality of luminaires of a lighting system, the method comprising the following steps:
   capturing with an imaging device, by a user adopting a stationary position, at least one image of the luminaires in a predominant field of view of the user in the stationary position;
   processing the at least one image to determine the predominant field of view of the user in the stationary position and a location of each of the luminaires relative to the determined predominant field of view of the user; and
   controlling the plurality of luminaires of the lighting system to emit illumination, based on their determined locations relative to the predominant field of view of the user in the stationary position, wherein determining the predominant field of view comprises determining at least a predominant center gaze region for the user in the stationary position within the at least one image, and a predominant peripheral vision region for the user within the at least one image, wherein the luminaires are controlled differently based on whether they are within the center gaze region or the peripheral vision region.

2. The method according to claim 1, wherein determining the predominant field of view comprises determining a predominant line of sight of the user, which lies along his predominant facing direction when adopting the stationary position, the luminaire locations being determined relative to the determined predominant line of sight.

3. The method according to claim 1, wherein a plurality of images is captured as the user performs an expected scanning motion across at least his predominant field of view whilst remaining in the stationary position, which are processed to determine the predominant field of view and the luminaire locations relative thereto.

4. The method according to claim 3, wherein the steps comprise:
   instructing the user to perform the expected scanning motion across his predominant field of view whilst remaining in the stationary position.

5. The method according to claim 4, wherein the instructing step comprises:
   controlling the luminaires to emit a dynamic illumination pattern as the images are captured so as to guide the user through the expected scanning motion, and/or
   controlling an output device available to the user to output to the user at least one instruction to convey the expected scanning motion to the user.

6. The method according to claim 3, wherein the processing step comprises combining the images to generate a composite image, the composite image covering a greater area of the user's predominant field of view than any one of the images individually, wherein the locations are determined by processing the composite image.

7. The method according to claim 3, wherein the expected scanning motion comprises gradually rotating the imaging device from an initial expected orientation to another expected orientation.

8. The method according to claim 2, wherein the initial orientation or the other orientation is such that an optical axis of the imaging device lies substantially parallel to the predominant line of sight of the user in the stationary position.

9. The method according to claim 1, wherein the initial orientation is such that the optical axis of the imaging device lies substantially parallel to the predominant line of sight, whereby the optical axis is rotated away from the predominant line of site as the scanning motion is performed.

10. The method according to claim 1, wherein the step of determining the user's predominant field of view comprises at least one of:

identifying a predetermined type of object in the at least one image, the luminaire locations being determined relative to the identified object and;

controlling a display to display to the user image data of the at least one captured image, and receiving from the user via a user interface a selection of at least one point and/or at least one region within the displayed image data, wherein the predominant field of view is determined based on the received user selection.

11. The method according to claim 4, wherein the instructing step comprises conveying to the user an angular range over which the imaging device should be scanned, wherein the user's predominant field of view is determined based on the conveyed angular range.

12. The method according to claim 3, wherein the steps further comprise:

determining an angular range over which the imaging device has been scanned, using the at least one image and/or sensor data captured as the scanning motion is performed by a separate sensor coupled to the imaging device, wherein the user's predominant field of view is determined based on the determined angular range.

13. The computer program product comprising code stored on a computer readable storage medium and configured so as when executed to implement the method of claim 1.

14. A lighting control apparatus for controlling a plurality of luminaires of a lighting system, the lighting control apparatus comprising:

an image input configured to receive from an imaging device at least one image, captured by a user adopting a stationary position, of the luminaires in a predominant field of view of the user in the stationary position;

an image processing module configured to process the at least one image to determine the predominant field of view of the user in the stationary position and a location of each of the luminaires relative to the determined predominant field of view of the user; and a control module configured to control the plurality of luminaires of the lighting system to emit illumination, based on their determined locations relative to the predominant field of view of the user in the stationary position, wherein determining the predominant field of view comprises determining at least a predominant center gaze region for the user in the stationary position within the at least one image, and a predominant peripheral vision region for the user within the at least one image, wherein the luminaires are controlled differently based on whether they are within the center gaze region or the peripheral vision region.

* * * * *